United States Patent
Xiao et al.

(10) Patent No.: US 12,437,459 B2
(45) Date of Patent: Oct. 7, 2025

(54) BULLET SCREEN COMMENT DISPLAY METHOD AND APPARATUS, BULLET SCREEN COMMENT SENDING METHOD AND APPARATUS, COMPUTER DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Yi Xiao, Shenzhen (CN); Richeng Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 238 days.

(21) Appl. No.: 18/125,669

(22) Filed: Mar. 23, 2023

(65) Prior Publication Data
US 2023/0326115 A1    Oct. 12, 2023

Related U.S. Application Data

(63) Continuation of application No. PCT/CN2022/098114, filed on Jun. 10, 2022.

(30) Foreign Application Priority Data

Jul. 5, 2021    (CN) .......................... 202110759469.3

(51) Int. Cl.
G06T 13/80    (2011.01)

(52) U.S. Cl.
CPC .................................... G06T 13/80 (2013.01)

(58) Field of Classification Search
None
See application file for complete search history.

(56) References Cited

U.S. PATENT DOCUMENTS

2018/0034874 A1    2/2018  Cornell

FOREIGN PATENT DOCUMENTS

| CN | 105959810 A | 9/2016 |
|---|---|---|
| CN | 108055552 A | 5/2018 |

(Continued)

OTHER PUBLICATIONS

Zhe et al, CN 10,906,8164 (translation to English), Dec. 21, 2018.*

(Continued)

*Primary Examiner* — Jeffrey J Chow
(74) *Attorney, Agent, or Firm* — Morgan, Lewis & Bockius LLP

(57) ABSTRACT

The present application discloses a bullet screen comment display method performed by a computer device. The method includes: displaying an interactive interface of a target scenario; and displaying, on the interactive interface, dynamic movements of a first bullet screen comment set moving in a first moving direction and a second bullet screen comment set moving in a second moving direction; where first bullet screen comment set includes N pieces of first bullet screen comment data; the second bullet screen comment set includes M pieces of second bullet screen comment data; N and M are positive integers; and the first moving direction and the second moving direction are different moving directions and at least a first bullet screen comment in the first bullet screen comment set is on a trajectory of colliding with at least a second bullet screen comment in the second bullet screen comment set.

21 Claims, 15 Drawing Sheets

(56) References Cited

FOREIGN PATENT DOCUMENTS

| | | |
|---|---|---|
| CN | 109068164 A | 12/2018 |
| CN | 109361946 A | 2/2019 |
| CN | 111147912 A | 5/2020 |
| CN | 112188225 A | 1/2021 |
| CN | 113473208 A | 10/2021 |
| WO | WO 2017185644 A1 | 11/2017 |

OTHER PUBLICATIONS

Tencent Technology, ISR, PCT/CN2022/098114, Sep. 13, 2022, 3 pgs.
Tencent Technology, WO, PCT/CN2022/098114, Sep. 13, 2022, 5 pgs.
Tencent Technology, IPRP, PCT/CN2022/098114, Dec. 14, 2023, 6 pgs.

* cited by examiner

BULLET SCREEN COMMENT DISPLAY METHOD AND APPARATUS, BULLET SCREEN COMMENT SENDING METHOD AND APPARATUS, COMPUTER DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2022/098114, entitled "BULLET SCREEN COMMENT DISPLAY METHOD AND APPARATUS, BULLET SCREEN COMMENT SENDING METHOD AND APPARATUS, COMPUTER DEVICE, COMPUTER-READABLE STORAGE MEDIUM, AND COMPUTER PROGRAM PRODUCT" filed on Jun. 10, 2022, which claims priority to Chinese Patent Application No. 202110759469.3, filed on Jul. 5, 2021, all of which are incorporated herein by reference in their entirety.

FIELD OF THE TECHNOLOGY

The present application relates to the field of data processing, and in particular, to a bullet screen comment display method and apparatus, a bullet screen comment sending method and apparatus, a computer device, a computer-readable storage medium, and a computer program product.

BACKGROUND OF THE DISCLOSURE

With the continuous development of computer networks, various video applications are emerging, users may also comment on video data in various video applications, and then comment data may be used as bullet screen comment data of the video data and displayed synchronously with the video data.

In existing applications, when bullet screen comment data of video data is displayed, each bullet screen comment data is generally displayed in a movable manner on a playback interface of the video data in sequence directly according to a chronological order of the bullet screen comment data. All bullet screen comments are displayed indiscriminately, which limits the efficiency of human-computer interaction and the display efficiency of the interactive interface.

SUMMARY

Embodiments of the present application provide a bullet screen comment display method and apparatus, a bullet screen comment sending method and apparatus, a computer device, a computer-readable storage medium, and a computer program product, which may increase display manners of bullet screen comment data, use different display methods for different types of bullet screen comments, and effectively improve the efficiency of users in obtaining effective information from numerous bullet screen comment data, thus improving the efficiency of human-computer interaction.

An embodiment of the present application provides a bullet screen comment display method performed by a computer device, the method including:

displaying an interactive interface of a target scenario; and displaying, on the interactive interface, dynamic movements of a first bullet screen comment set moving in a first moving direction and a second bullet screen comment set moving in a second moving direction; where first bullet screen comment set includes N pieces of first bullet screen comment data; the second bullet screen comment set includes M pieces of second bullet screen comment data; N and M are positive integers; and the first moving direction and the second moving direction are different moving directions and at least a first bullet screen comment in the first bullet screen comment set is on a trajectory of colliding with at least a second bullet screen comment in the second bullet screen comment set.

An embodiment of the present application provides a bullet screen comment sending method performed by a computer device, the method including:

displaying an interactive interface of a target scenario; and the target scenario includes a first team and a second team;

determining a selected team as a target team in response to a selection operation on the first team or the second team;

sending bullet screen comment data for the target team in response to a bullet screen comment data entry operation; and displaying, on the interactive interface, bullet screen comment data of the first team moving in a first moving direction, and displaying, on the interactive interface, bullet screen comment data of the second team moving in a second moving direction.

An embodiment of the present application provides a bullet screen comment display method performed by a computer device, the method including:

displaying an interactive interface of a target scenario; and dynamically displaying a first bullet screen comment set and a second bullet screen comment set on the interactive interface; where first bullet screen comment set includes N pieces of first bullet screen comment data; the second bullet screen comment set includes M pieces of second bullet screen comment data; N and M are positive integers; and when there is a confrontation trigger event between the first bullet screen comment data in the first bullet screen comment set and the second bullet screen comment data in the second bullet screen comment set, triggering a confrontation display event between the first bullet screen comment data and the second bullet screen comment data related to the confrontation trigger event.

An embodiment of the present application provides a bullet screen comment display apparatus, including:

a first display module, configured to display an interactive interface of a target scenario; and a second display module, configured to display, on the interactive interface, dynamic movements of a first bullet screen comment set moving in a first moving direction and a second bullet screen comment set moving in a second moving direction; where the first bullet screen comment set includes N pieces of first bullet screen comment data; the second bullet screen comment set includes M pieces of second bullet screen comment data; N and M are positive integers; and the first moving direction and the second moving direction are different moving directions and at least a first bullet screen comment in the first bullet screen comment set is on a trajectory of colliding with at least a second bullet screen comment in the second bullet screen comment set.

An embodiment of the present application provides a bullet screen comment sending apparatus, including:

an interface display module, configured to display an interactive interface of a target scenario; where the target scenario includes a first team and a second team;
a team selection module, configured to determine a selected team as a target team in response to a selection operation on the first team or the second team; and
a bullet screen comment sending module, configured to send bullet screen comment data for the target team in response to a bullet screen comment data entry operation; and
the interface display module is further configured to display, on the interactive interface, bullet screen comment data of the first team moving in a first moving direction, and display, on the interactive interface, bullet screen comment data of the second team moving in a second moving direction.

An embodiment of the present application provides a bullet screen comment display apparatus, including:

an interactive interface display module, configured to display an interactive interface of a target scenario;
a dynamic display module, configured to dynamically display a first bullet screen comment set and a second bullet screen comment set on the interactive interface; where first bullet screen comment set includes N pieces of first bullet screen comment data; the second bullet screen comment set includes M pieces of second bullet screen comment data, and N and M are positive integers; and
an event trigger module, configured to: when there is a confrontation trigger event between the first bullet screen comment data in the first bullet screen comment set and the second bullet screen comment data in the second bullet screen comment set, trigger a confrontation display event between the first bullet screen comment data and the second bullet screen comment data related to the confrontation trigger event.

An embodiment of the present application provides a computer device, including a memory and a processor. The memory stores a computer program, and when the computer program is executed by the processor, the bullet screen comment display method and the bullet screen comment sending method provided in embodiments of the present application are performed.

An embodiment of the present application provides a non-transitory computer-readable storage medium. The computer-readable storage medium stores a computer program, the computer program includes program instructions, and when the program instructions are executed by a processor, the bullet screen comment display method and the bullet screen comment sending method provided in embodiments of the present application are performed.

An embodiment of the present application provides a computer program product or a computer program, including computer instructions stored in a computer-readable storage medium. A processor of a computer device reads the computer instructions from the computer-readable storage medium, and when executing the computer instructions, the processor performs the bullet screen comment display method and the bullet screen comment sending method provided in embodiments of the present application.

In the embodiments of the present application, the moving bullet screen comment data may be displayed on the interactive interface, and different types of bullet screen comment data have different moving directions, which increases display manners of the bullet screen comment data and improves display interest of the bullet screen comment data. Besides, different moving directions represent different types of bullet screen comments, so that efficiency of obtaining bullet screen comment data by a user may be improved, and the user does not need to obtain desired bullet screen comment information from a plurality of types of mixed bullet screen comment data, which may improve the efficiency of human-computer interaction.

BRIEF DESCRIPTION OF THE DRAWINGS

To describe the technical solutions in the present application or in the prior art more clearly, the following briefly introduces the accompanying drawings for describing the embodiments or the prior art. Apparently, the accompanying drawings in the following description show merely some embodiments of the present application, and a person of ordinary skill in the art may still derive other drawings from the accompanying drawings without creative efforts.

DESCRIPTION OF EMBODIMENTS

The technical solutions in embodiments of the present application are clearly and completely described in the following with reference to the accompanying drawings in the embodiments of the present application. Apparently, the described embodiments are merely some rather than all of the embodiments of the present application. All other embodiments obtained by a person of ordinary skill in the art based on the embodiments of the present application without making creative efforts shall fall within the protection scope of the present application.

It can be understood that in the embodiments of the present application, user-related data is involved. When the embodiments of the present application are applied to a specific product or technology, user permission or consent needs to be obtained, and the collection, usage, and processing of related data need to comply with relevant laws, regulations and standards of related countries and regions.

Figure 1:
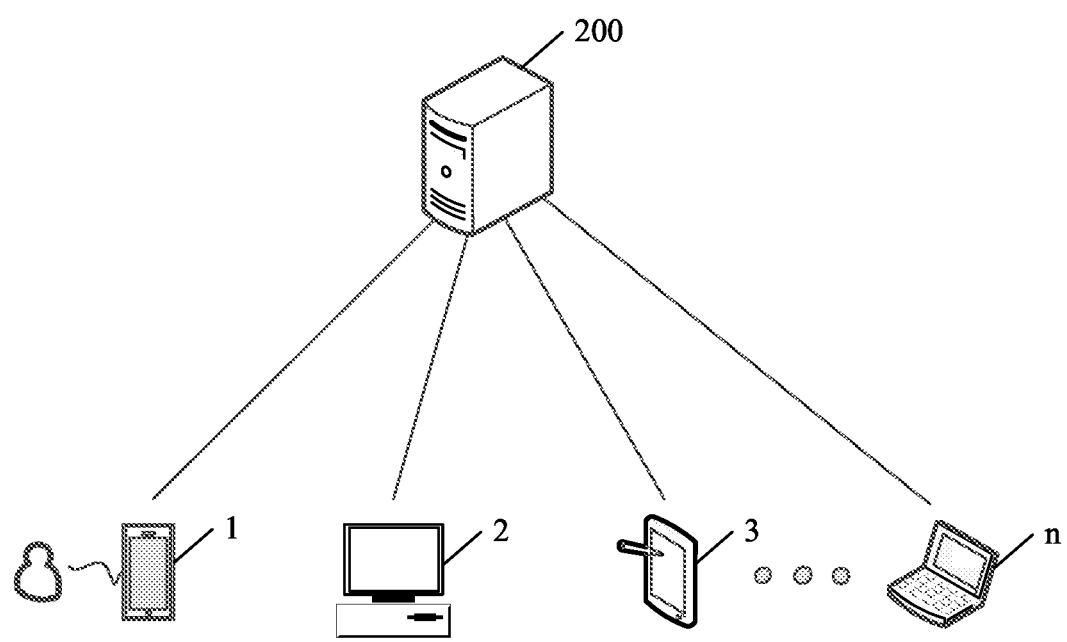
FIG. 1 is a schematic structural diagram of a network architecture according to an embodiment of the present application.

FIG. 1 is a schematic structural diagram of a network architecture according to an embodiment of the present application. As shown in FIG. 1, the network architecture may include a server 200 and a terminal device cluster, and the terminal device cluster may include one or more terminal devices. A number of terminal devices is not limited herein. As shown in FIG. 1, the plurality of terminal devices may specifically include terminal device 1, terminal device 2, terminal device 3, . . . , and terminal device n. As shown in FIG. 1, terminal device 1, terminal device 2, terminal device 3, . . . , and terminal device n may all be connected to the server 200 through a network, so that each terminal device may perform data interaction with the server 200 through the network connection.

The server 200 shown in FIG. 1 may be an independent physical server, or a server cluster including a plurality of physical servers, or a distributed system, or may be a cloud server that provides basic cloud computing services such as cloud services, cloud databases, cloud computing, cloud functions, cloud storage, network services, cloud communications, middleware services, domain name services, security services, CDNs, and big data and artificial intelligence platforms. The terminal device may be intelligent terminals such as smartphones, tablet computers, laptop computers, desktop computers, and smart TVs.

Terminal device 1, terminal device 2, terminal device 3, . . . , and terminal device n may all be terminal devices belonging to different users. Therefore, there may be n users herein, where n is a positive integer. The n users may participate in topic discussion through terminal devices held by themselves. The topic discussion may belong to a topic interaction scenario. The topic interaction scenario may include a plurality of topic viewpoints. Each user may select, through a terminal device of the user, which topic viewpoint to support. After the selection, the user may send bullet screen comment data to support the selected topic viewpoint.

Each terminal device may send, to the server 200, collected bullet screen comment data entered by a user for a selected topic viewpoint, to aggregate bullet screen comment data, that is, bullet screen comment data entered by each user for the same topic viewpoint is aggregated, to classify bullet screen comment data. One topic viewpoint corresponds to one type of bullet screen comment data, and then the server 200 may send the aggregated result to each terminal device for display.

Figure 2:
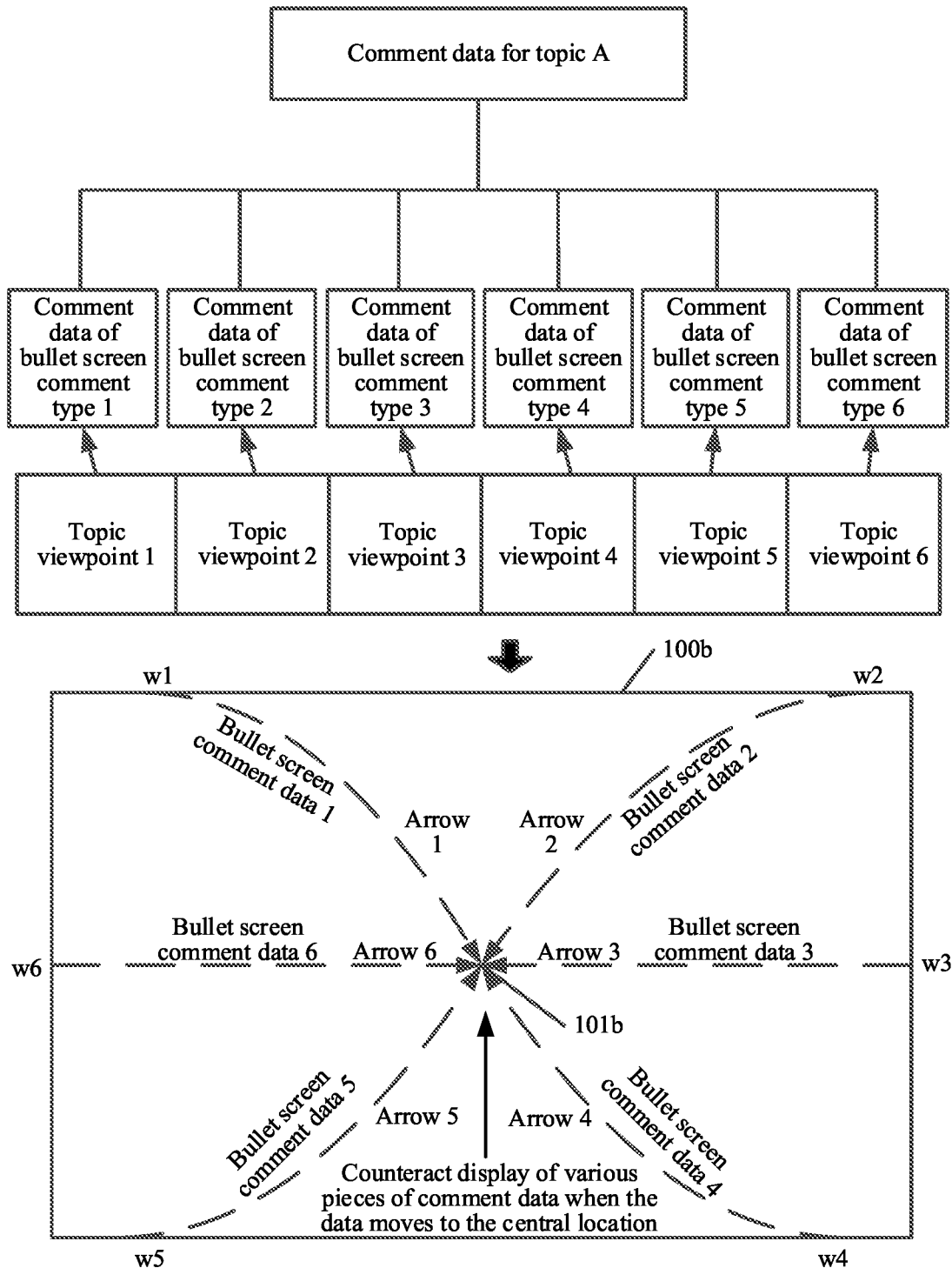
FIG. 2 is a schematic diagram of a scenario of displaying bullet screen comment data according to an embodiment of the present application.

FIG. 2 is a schematic diagram of a scenario of displaying bullet screen comment data according to an embodiment of the present application. The n users may all participate in the discussion of topic A through their own terminal devices. The topic A may be any topic, and may be specifically set according to an actual application scenario. The topic A may include 6 topic viewpoints, and each user may select a topic viewpoint that the user supports. One topic viewpoint corresponds to bullet screen comment data of one bullet screen comment type. For example, topic viewpoint 1 may correspond to bullet screen comment data belonging to bullet screen comment type 1, topic viewpoint 2 may correspond to bullet screen comment data belonging to bullet screen comment type 2, topic viewpoint 3 may correspond to bullet screen comment data belonging to bullet screen comment type 3, topic viewpoint 4 may correspond to bullet screen comment data belonging to bullet screen comment type 4, topic viewpoint 5 may correspond to bullet screen comment data belonging to bullet screen comment type 5, and topic viewpoint 6 may correspond to bullet screen comment data belonging to bullet screen comment type 6.

As an example, that a number of bullet screen comment data of each bullet screen comment type is 1 is used as an example for description. If there are a plurality of pieces of bullet screen comment data, the plurality of pieces of bullet screen comment data are displayed sequentially according to generation times in the same manner. For example, bullet screen comment data of bullet screen comment type 1 may include bullet screen comment data 1, bullet screen comment data of bullet screen comment type 2 may include bullet screen comment data 2, bullet screen comment data of bullet screen comment type 3 may include bullet screen comment data 3, bullet screen comment data of bullet screen comment type 4 may include bullet screen comment data 4, bullet screen comment data of bullet screen comment type 5 may include bullet screen comment data 5, and bullet screen comment data of bullet screen comment type 6 may include bullet screen comment data 6. The bullet screen comment data of the various bullet screen comment types may be displayed in a confrontation manner according to different initial positions and different moving directions.

As an example, after the server sends the aggregation result of the bullet screen comment data to each terminal device, the bullet screen comment data displayed on the terminal interface of each terminal device is the same. Therefore, a terminal interface 100b herein may be an interface of displaying bullet screen comment data on any one of the n terminal devices. As shown in FIG. 2, bullet screen comment data 1 may be displayed in a movable manner from an initial position w1 according to a trajectory indicated by arrow 1, bullet screen comment data 2 may be displayed in a movable manner from an initial position w2 according to a trajectory indicated by arrow 2, bullet screen comment data 3 may be displayed in a movable manner from an initial position w3 according to a trajectory indicated by arrow 3, bullet screen comment data 4 may be displayed in a movable manner from an initial position w4 according to a trajectory indicated by arrow 4, bullet screen comment data 5 may be displayed in a movable manner from an initial position w5 along a trajectory indicated by arrow 5, and bullet screen comment data 6 may be displayed in a movable manner from an initial position w6 along a trajectory indicated by arrow 6.

When bullet screen comment data 1, bullet screen comment data 2, bullet screen comment data 3, bullet screen comment data 4, bullet screen comment data 5, and bullet screen comment data 6 are displayed in a movable manner at the central position 101*b* of the terminal interface 100*b*, display of bullet screen comment data 1, bullet screen comment data 2, bullet screen comment data 3, bullet screen comment data 4, bullet screen comment data 5, and bullet screen comment data 6 may be counteracted (a manner of confrontation display), and a confrontation animation for confrontation display of the six pieces of bullet screen comment data may be displayed. The confrontation animation may be a counteracting effect. The counteracting effect is a special effect that two pieces of bullet screen comment data disappear after the two pieces of bullet screen comment data meet. For example, it may be that two pieces of bullet screen comment data collide with each other and gradually shrink until the two pieces of bullet screen comment data disappear.

According to the method provided by the embodiments of the present application, bullet screen comment data of different topic viewpoints on a same topic may be classified and aggregated (which may also be other scenarios, such as a target scenario described in a corresponding embodiment in FIG. 3 below), and then the bullet screen comment data of different bullet screen comment types is displayed in a confrontation manner, which increases display manners of the bullet screen comment data and improves interactive interest of the bullet screen comment data between users.

Figure 3:
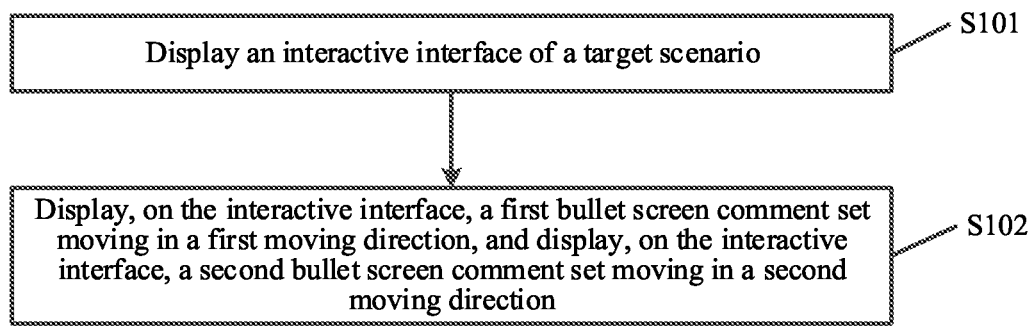
FIG. 3 is a schematic flowchart of a bullet screen comment display method according to an embodiment of the present application.

FIG. 3 is a schematic flowchart of a bullet screen comment display method according to an embodiment of the present application. An execution entity in this embodiment of the present application may be a computer device or a computer device cluster including a plurality of computer devices. The computer device may be a server or a terminal device. Therefore, the execution entity in this embodiment of the present application may be a server, may be a terminal device, or may include a server and a terminal device. In some embodiments, an example in which the execution entity in this embodiment of the present application is a terminal device is used for description. As shown in FIG. 3, the method may include step S101 to step S102.

Step S101: Display an interactive interface of a target scenario.

As an example, the target scenario may be a scenario in which any user may interact and communicate. For example, the target scenario may be a live broadcast scenario, a video playback scenario, or a topic interaction scenario. Therefore, the interactive interface may be a terminal interface for user interaction in the target scenario. For example, if the target scenario is a live broadcast scenario, the interactive interface may be an interface for playing live broadcast video images in the live broadcast scenario. If the target scenario is a video playback scenario, the interactive interface may be an interface for playing video data in the video playback scenario. If the target scenario is a topic interaction interface, the interaction interface may be an interface for topic interaction. In this case, images, slideshows, or video data may be displayed on the interaction interface according to an actual application scenario.

Therefore, the terminal device may display the interactive interface. For example, the terminal device may display the interactive interface according to the user's viewing operation on a live broadcast video screen in the live broadcast scenario, or the terminal device may display the interactive interface according to the user's playback operation on video data in the video playback scenario, or the terminal device may display the interactive interface according to a topic interaction participation operation in the topic interaction scenario.

The target scenario may include a plurality of bullet screen comment types. For example, the target scenario is a game live broadcast scenario, and there are two teams fighting each other in the game live broadcast scenario (a specific number of teams may be determined according to an actual application scenario). In this case, the target scenario may include two bullet screen comment types, one team corresponds to one bullet screen comment type, and bullet screen comment data of a bullet screen comment type corresponding to one team is bullet screen comment data for the team, for example, may be bullet screen comment data supporting the team.

If the target scenario is a video playback scenario, TV dramas or movies may be played on an interactive interface in the video playback scenario, then, a related question for the played TV dramas or movies may be preset, and a plurality of options may be set for this question. An option may correspond to a bullet screen comment type, and bullet screen comment data of a bullet screen comment type corresponding to an option is bullet screen comment data commented by a user who selects this option. For example, the question may be a prediction topic about whether male and female protagonists may be together in the end. Then, two options may be included for this question, where one option is yes, and the other option is no.

If the target scenario is a topic interaction scenario, any topic may be set in the topic interaction scenario. For example, the topic may be whether earphone 1, earphone 2, or earphone 3 is more worth buying, and then this topic may include 3 topic viewpoints (that is, three bullet screen comment types, and one topic viewpoint corresponds to one bullet screen comment type). One topic viewpoint is that earphone 1 is more worth buying, one topic viewpoint is that earphone 2 is more worth buying, and one topic viewpoint is earphone 3 is more worth buying. Bullet screen comment data of a bullet screen comment type corresponding to a topic viewpoint may be bullet screen comment data commented by a user who supports the topic viewpoint.

Step S102: Display, on the interactive interface, dynamic movements of a first bullet screen comment set moving in a first moving direction and a second bullet screen comment set moving in a second moving direction.

First bullet screen comment set includes N pieces of first bullet screen comment data. The second bullet screen comment set includes M pieces of second bullet screen comment data. The bullet screen comment type of the first bullet screen comment data is different from the bullet screen comment type of the second bullet screen comment data, the bullet screen comment data is used to comment on the target scenario, and N and M are positive integers. The first moving direction and the second moving direction are different moving directions.

As an example, the target scenario may include a plurality of bullet screen comment types, one bullet screen comment type may correspond to one bullet screen comment set, and a bullet screen comment set corresponding to a bullet screen comment type may include all bullet screen comment data of the bullet screen comment type. Since, when there are a plurality of bullet screen comment types in the target scenario, principles of displaying bullet screen comment data of different bullet screen comment types differently according to different moving directions are similar. Therefore, a principle of displaying bullet screen comment data of two bullet screen comment types differently according to different moving directions is used as an example for description.

The first bullet screen comment set may be a set of bullet screen comment data of any bullet screen comment type in the target scenario, the second bullet screen comment set may also be a set of bullet screen comment data of any bullet screen comment type in the target scenario, and the bullet screen comment type corresponding to the first bullet screen comment set is different from the bullet screen comment type corresponding to the second bullet screen comment set. The bullet screen comment data in the first bullet screen comment set may be called first bullet screen comment data, and the bullet screen comment data in the second bullet screen comment set may be called second bullet screen comment data. The first bullet screen comment set may include N pieces of first bullet screen comment data, and the second bullet screen comment set may include M pieces of second bullet screen comment data. N and M are both positive integers. Specific values of N and M are determined according to an actual application scenario.

A manner in which the terminal device displays the first bullet screen comment set and the second bullet screen comment set in different directions on the interactive interface includes: on the interactive interface, the terminal device may display a process of moving the first bullet screen comment data in the first bullet screen comment set from a first initial position according to the first moving direction, and display a process of moving the second bullet screen comment data in the second bullet screen comment set from a second initial position according to the second moving direction.

As an example, both the first bullet screen comment data and the second bullet screen comment data may be bullet screen comment data on the interactive interface. The interactive interface may also include a video playback area, and the video playback area may occupy the entire interactive interface, or may occupy a part of the interactive interface. The bullet screen comment data may be displayed above video data played in the video playback area. The first initial position may be a position at the left edge of the video playback area, and the second initial position may be a position at the right edge of the video playback area. Therefore, the first moving direction may be a straight-line direction from left to right in the video playing area, and the second moving direction may be a straight-line direction from right to left in the video playing area. Alternatively, the first initial position may be a position at the upper edge of the video playing area, and the second initial position may be a position at the lower edge of the video playing area. Therefore, the first moving direction may be a straight-line direction from top to bottom in the video playing area, and the second moving direction may be a straight-line direction from bottom to top in the video playing area. The first initial position may also be a position at the lower left corner of the video playback area, and the second initial position may also be a position at the lower right corner of the video playback area. The first moving direction may be a parabolic direction from the lower left corner of the video playback area to the central position of the video playback area, and the second moving direction may be a parabolic direction from the lower right corner of the video playing area to the central position of the video playing area.

The first initial position, the second initial position, the first moving direction, and the second moving direction may be set arbitrarily according to an actual application scenario without limitation. When displaying the first bullet screen comment data in the first bullet screen comment set and the second bullet screen comment data in the second bullet screen comment set, the terminal device may display them sequentially according to generation timestamps of the bullet screen comment data. Moving speeds of bullet screen comment data may be the same, or may be different.

For example, the target scenario is a match live broadcast scenario, the interactive interface is a match live broadcast interface in the match live broadcast scenario, the match live broadcast scenario includes two participating teams, and the two participating teams are a first match team and a second match team. In this case, the first bullet screen comment set may be a bullet screen comment set for the first match team, the first bullet screen comment data in the first bullet screen comment set may be bullet screen comment data (such as bullet screen comment data) sent by users supporting the first match team, and the second bullet screen comment data in the second bullet screen comment set may be bullet screen comment data (such as bullet screen comment data) sent by users supporting the second match team. Therefore, on the match live broadcast interface, the first bullet screen comment set corresponding to the first game team may be displayed in a first bullet screen comment color, and the second bullet screen comment set corresponding to the second game team may be displayed in a second bullet screen comment color.

As an example, the terminal device may also obtain the first bullet screen comment data of the first match team and the second bullet screen comment data of the second match team according to a period node (which may be preset, for example, there may be a periodic node every 5 minutes), count the number of first bullet screen comment data of the first team and the number of second bullet screen comment data of the second team obtained in each period, and then compare the number of the first bullet screen comment data with the number of the second more bullet screen comment data, and periodically display a result of bullet screen comment confrontation at a moment indicated by the corresponding period node. The result of the confrontation indicates a winning or losing situation of competition between popularity of the two teams, and the team with the larger number of bullet screen comments is more popular, which is equivalent to winning the popularity competition. The result of the bullet screen comment confrontation may be a result that comments of the first match team win (when the number of first bullet screen comment data is greater than the number of second bullet screen comment data), comments of the second match team win (when the number of the first bullet screen comment data is less than the number of the second bullet screen comment data), or comments of the first match team wins are equal to comments of the second match team wins (when the number of the first bullet screen comment data is equal to the number of the second bullet screen comment data). The server may also obtain the first bullet screen comment data of the first game team and the second bullet screen comment data of the second game team according to a periodic node, and then send the obtained first bullet screen comment data and second bullet screen comment data to a terminal device. This is not limited.

For example, the N pieces of first bullet screen comment data in the first bullet screen comment set and the M pieces of second bullet screen comment data in the second bullet screen comment set may be bullet screen comment data obtained in a target period corresponding to a period node. Then, when N is greater than M, bullet screen comment confrontation victory information (which is equivalent to the result that comments of the first match team win) for the first match team may be displayed on the interactive interface at a target moment, where the target moment is a moment indicated by the period node corresponding to the target period. This indicates that the number of first bullet screen comment data is greater than the number of second bullet screen comment data in the target period. When M is greater than N, bullet screen comment confrontation victory information (which is equivalent to the result that comments of the second match team win) for the second match team may be displayed on the interactive interface at a target moment, where the target moment is a moment indicated by the period node corresponding to the target period. This indicates that the number of first bullet screen comment data is less than the number of second bullet screen comment data in the target period. When N is equal to M, bullet screen comment confrontation tie information (which is equivalent to the result that comments of the first match team are equal to comments of the second match team) for the first match team and the second match team may be displayed on the interactive interface at a target moment, where the target moment is a moment indicated by the period node corresponding to the target period. This indicates that the number of first bullet screen comment data is equal to the number of second bullet screen comment data in the target period. By comparing the number of bullet screen comment data of the two teams to prompt the result of the bullet screen comment confrontation, it is equivalent to presenting related information of the bullet screen comment data in a quantitative dimension, thereby improving the efficiency of obtaining bullet screen comment information by a user.

In this embodiment of the present application, the user may select a match team supported by the user. For example, the terminal device may display a match team selection list including the first match team and the second match team (the interactive interface may include a team selection button, and the terminal device may output a match team selection list according to the user's click operation on the selection button), and then the terminal device may obtain the selected team in response to the selection operation on the target match team in the match team selection list. The match live broadcast interface may be an interface in a video client in the terminal device. A user account may be logged into in the video client. When the user selects a game team in the team selection list, the user may consume a specific number of gold coins to select successfully. The gold coin may be a virtual game currency, a virtual coin, or a digitized RMB, etc., and the gold coin may be deducted from the user account logged into in the video client.

After selecting a match team in the team selection list of the terminal device, the user may also enter bullet screen comment data on the interactive interface or another comment interface (such as a floating window sub-interface independently displayed on the interactive interface). If the match team selected by the user (the target match team) is the first match team, the bullet screen comment data entered by the user may be used as the first bullet screen comment data in the first bullet screen comment set. If the match team selected by the user (the target match team) is the second match team, the bullet screen comment data entered by the user may be used as the second bullet screen comment data in the second bullet screen comment set. Both the first bullet screen comment set and the second bullet screen comment set may include bullet screen comment data commented by one or more users. In this embodiment of the present application, the match team may be selected so that bullet screen comment data published subsequently may be used as bullet screen comment data corresponding to the selected match team. This means that the user may also perceive the confrontation, which may improve the user's participation and the diversity of the bullet screen comment function, so as to improve the efficiency of human-computer interaction.

Figure 4:
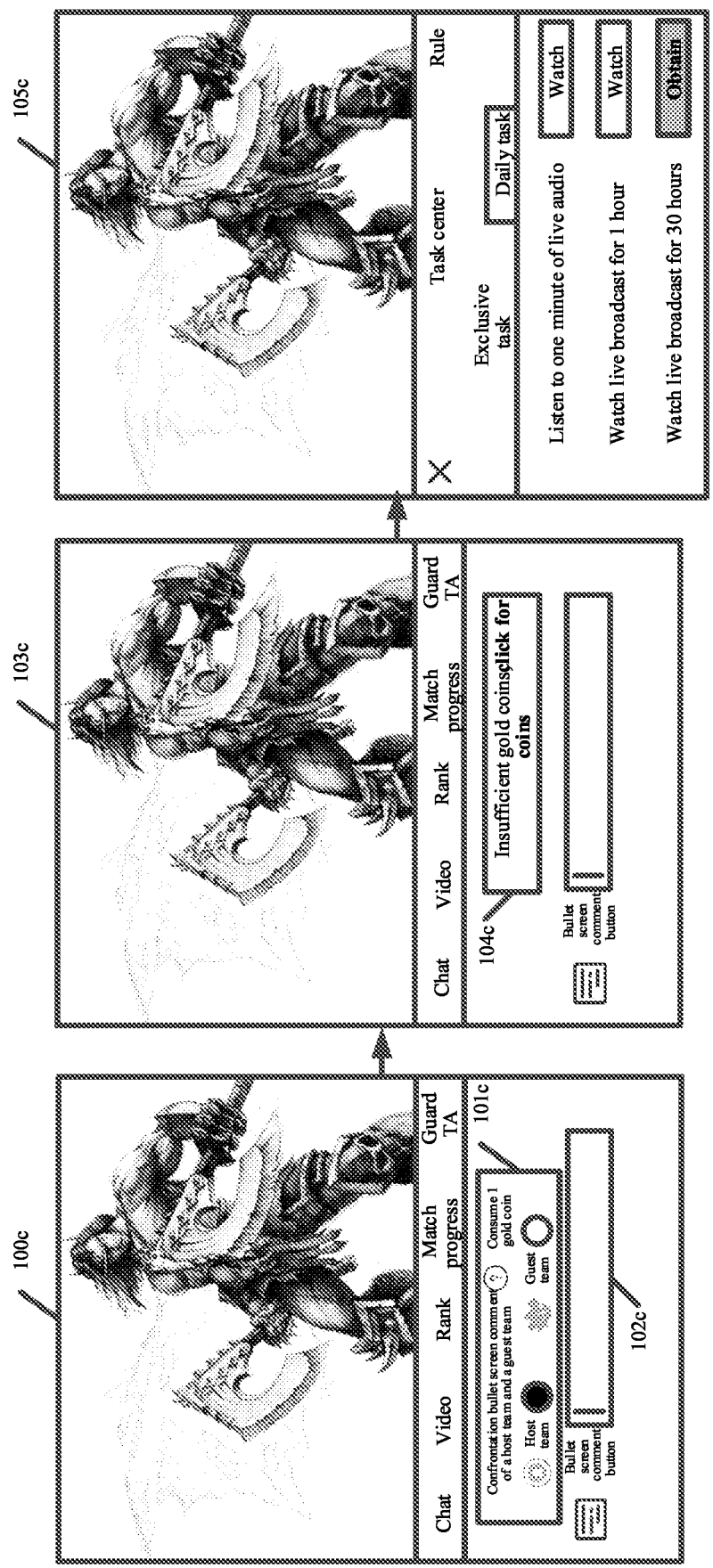
FIG. 4 is a schematic diagram of a team selection interface according to an embodiment of the present application.

FIG. 4 is a schematic diagram of a team selection interface according to an embodiment of the present application. An interface 100c, an interface 103c, and an interface 105c may all be interactive interfaces at different moments. The interface 100c includes a pop-up window 101c. The match live broadcast scenario may include a host team and a guest team. For example, the host team may be the first match team, and the guest team may be the second match team. The user may select, in the pop-up window 101c of the interface 100c, a team that the user supports. For example, the host team or the guest team may be selected. After selection, bullet screen comment data for supporting the team selected by the user may be entered in a bullet screen comment data input box 102c.

Since the user may deduct a specific number of virtual resources, such as gold coins or points, when the user selects the team that the user supports, if the number of gold coins in the account balance is insufficient when the user selects the team that the user supports, this may be displayed on the interface 103c. The interface 103c includes a pop-up window 104c, and the pop-up window 104c includes prompt information "insufficient gold coins, click to obtain gold coins". The user may click on the prompt information in the pop-up window 104c, and jumps to an interface 105c, where the interface 105c includes a task center. A list of the task center includes a plurality of tasks that may earn or receive gold coins. The user may select a favorite task to perform, and then earn gold coins to select the team that the user supports.

As an example, if the target scenario is a topic interaction scenario, and the topic interaction scenario includes a first topic viewpoint and a second topic viewpoint, the first bullet screen comment set may be a bullet screen comment set for the first topic viewpoint and the first bullet screen comment set may include bullet screen comment data commented by users who select to support the first topic viewpoint, and the second bullet screen comment set may be a bullet screen comment set for the second topic viewpoint and the second bullet screen comment set may include bullet screen comment data commented by users who select to support the second topic viewpoint.

In some embodiments, when N is greater than a bullet screen comment display number threshold, step 102 of displaying the first bullet screen comment set moving in the first moving direction on the interactive interface may be implemented through the following technical solutions: displaying, on the interactive interface, the selected first bullet screen comment data moving in the first moving direction; where the selected first bullet screen comment data is first bullet screen comment data that is sorted in front in a first sorting result and that meets the bullet screen comment display number threshold, and the first sorting result is a result obtained by sorting the N pieces of first bullet screen comment data according to an order of generation timestamps of the N pieces of first bullet screen comment data.

In some embodiments, when M is greater than the bullet screen comment display number threshold, step 102 of displaying the second bullet screen comment set moving in the second moving direction on the interactive interface may be implemented through the following technical solutions: displaying, on the interactive interface, the selected second bullet screen comment data moving in the second moving direction; where the selected second bullet screen comment data is second bullet screen comment data that is sorted in front in a second sorting result and that meets the bullet screen comment display number threshold, and the second sorting result is a result obtained by sorting the M pieces of second bullet screen comment data according to an order of generation timestamps of the M pieces of second bullet screen comment data.

A number of displayed bullet screen comment data is limited by the bullet screen comment display number threshold, to avoid that the interactive interface is occupied by excessive bullet screen comments and consequently the display effect of the target scenario is affected. Therefore, the display effect of the target scenario may be ensured.

It is understandable that the first bullet screen comment set may include a large number of first bullet screen comment data, which is difficult to display completely in a short time on the interactive interface. Therefore, the first bullet data to be displayed needs to be selected from the N pieces of first bullet screen comment data included in the first bullet screen comment set. Specifically, the terminal device may obtain the bullet screen comment display number threshold. The bullet screen comment display number threshold may be set according to an actual application scenario. The bullet screen comment display number threshold is a maximum number of the first bullet screen comment data that may be displayed or a maximum number of the second bullet screen comment that may be displayed.

Therefore, the bullet screen comment display number threshold may be recorded as P, where P is an integer. If N is less than or equal to the bullet screen comment display number threshold, all the N pieces of first bullet screen comment data may be displayed on the interactive interface. If N is greater than the bullet screen comment display number threshold, P pieces of first bullet screen comment data to be displayed may be selected from the N pieces of first bullet screen comment data according to an order of generation timestamps corresponding to each of the N pieces of first bullet screen comment data, and the P pieces of first bullet screen comment data may be displayed in a movable manner on the interactive interface according to the first moving direction. For example, the P pieces of first bullet screen comment data may be P pieces of first bullet screen comment data with the earliest generation timestamp in the first bullet screen comment set, or the P pieces of first bullet screen comment data may be P pieces of first bullet screen comment data randomly selected from the first bullet screen comment set.

Similarly, the second bullet screen comment set may also include a large number of second bullet screen comment data, which is difficult to display completely in a short time on the interactive interface. Therefore, the second bullet data to be displayed needs to be selected from the M pieces of second bullet screen comment data included in the second bullet screen comment set. Similarly, the terminal device may obtain bullet screen comment display number threshold P.

Therefore, if M is less than or equal to the bullet screen comment display number threshold, all the M pieces of second bullet screen comment data may be displayed on the interactive interface. If M is greater than the bullet screen comment display number threshold, P pieces of second bullet screen comment data to be displayed may be selected from the M pieces of second bullet screen comment data according to an order of generation timestamps corresponding to each of the M pieces of second bullet screen comment data, and the P pieces of second bullet screen comment data may be displayed in a movable manner on the interactive interface according to the second moving direction. For example, the P pieces of second bullet screen comment data may be P pieces of second bullet screen comment data with the earliest generation timestamp in the second bullet screen comment set, or the P pieces of second bullet screen comment data may be P pieces of second bullet screen comment data randomly selected from the second bullet screen comment set.

As an example, the terminal device may also obtain and aggregate bullet screen comment data according to a fragmenting time node. An interval of the fragmenting time node may be determined according to an actual application scenario. For example, there may be a fragmenting time node every 300 milliseconds. Therefore, the terminal device may obtain and aggregate bullet screen comment data every 300 milliseconds, and the obtained bullet screen comment data includes the N pieces of first bullet screen comment data and the M pieces of second bullet screen comment data. In other words, the first bullet screen comment set and the second bullet screen comment set may include bullet screen comment data within an interval of 300 milliseconds, and the terminal device may obtain and aggregate bullet screen comment data every 300 milliseconds, and display the obtained and aggregated new bullet screen comment data on the interactive interface every 300 milliseconds.

Besides, when there is a confrontation trigger event between the first bullet screen comment data in the first bullet screen comment set and the second bullet screen comment data in the second bullet screen comment set, a confrontation display event between the first bullet screen comment data and the second bullet screen comment data related to the confrontation trigger event is triggered. Any first bullet screen comment data in the first bullet screen comment set may be represented as first target bullet screen comment data, and any second bullet screen comment data in the second bullet screen comment set may be represented as second target bullet screen comment data. In a process of displaying the first target bullet screen comment data and the second target bullet screen comment data in different directions on the interactive interface (such as displaying the first bullet screen comment data in a movable manner from the first initial position according to the first moving direction, and displaying the second bullet screen comment data in a movable manner from the second initial position according to the second moving direction), the first target bullet screen comment data is any first bullet screen comment data, and the second target bullet screen comment data is any second bullet screen comment data. When the first target bullet screen comment data and the second target bullet screen comment data are at a same display position of the interactive interface at a same moment (it may be understood as that the first target bullet screen comment data and the second target bullet screen comment data are in contact, such as being located at a same position on a same horizontal line of the interactive interface), it represents that there is a confrontation trigger event between the first bullet screen comment data in the first bullet screen comment set and the second bullet screen comment data in the second bullet screen comment set. A confrontation display event between the first bullet screen comment data and the second bullet screen comment data related to the confrontation trigger event is triggered, for example, the first target bullet screen comment data and the second bullet screen comment data may be deleted from the interactive interface. That is, it may be understood as the counteracting display of the first target bullet screen comment data and the second target bullet screen comment data, that is, the first target bullet screen comment data and the second target bullet screen comment data are not displayed after counteracting, which is equivalent to hiding the first target bullet screen comment data and the second target bullet screen comment data on the interactive interface. In a process of displaying the first target bullet screen comment data and the second target bullet screen comment data in different directions on the interactive interface, the first target bullet screen comment data is any first bullet screen comment data, and the second target bullet screen comment data is any second bullet screen comment data. When the first target bullet screen comment data and the second target bullet screen comment data are at a same display position of the interactive interface at a same moment, it represents that there is a confrontation trigger event between the first bullet screen comment data in the first bullet screen comment set and the second bullet screen comment data in the second bullet screen comment set. A confrontation display event between the first bullet screen comment data and the second bullet screen comment data related to the confrontation trigger event is triggered, for example, a confrontation animation between the first target bullet screen comment data and the second target bullet screen comment data may be displayed on the interactive interface. The confrontation animation may be a confrontation special effect, for example, the confrontation special effect may be a collision special effect between the bullet screen comment data and the second target bullet screen comment data. A specific form of the confrontation animation may be set according to an actual application scenario. In a process of displaying the first target bullet screen comment data and the second target bullet screen comment data in different directions on the interactive interface, the first target bullet screen comment data is any first bullet screen comment data, and the second target bullet screen comment data is any second bullet screen comment data. When the first target bullet screen comment data and the second target bullet screen comment data are at a same display position of the interactive interface at a same moment, it represents that there is a confrontation trigger event between the first bullet screen comment data in the first bullet screen comment set and the second bullet screen comment data in the second bullet screen comment set. A confrontation display event between the first bullet screen comment data and the second bullet screen comment data related to the confrontation trigger event is triggered, for example, the confrontation animation between the first target bullet screen comment data and the second target bullet screen comment data is displayed on the interactive interface, and any one of the following processing is performed: hiding the first target bullet screen comment data and the second target bullet screen comment data on the interactive interface during the display process of the confrontation animation; hiding the first target bullet screen comment data and the second target bullet screen comment data on the interactive interface after the confrontation animation display is completed; and hiding the first target bullet screen comment data and the second target bullet screen comment data on the interactive interface before the confrontation animation display. By counteracting display of bullet screen comment information and the confrontation animation, the diversity of display effects of bullet screen comment data may be enriched and the utilization rate of display resources may be improved.

Figure 5:
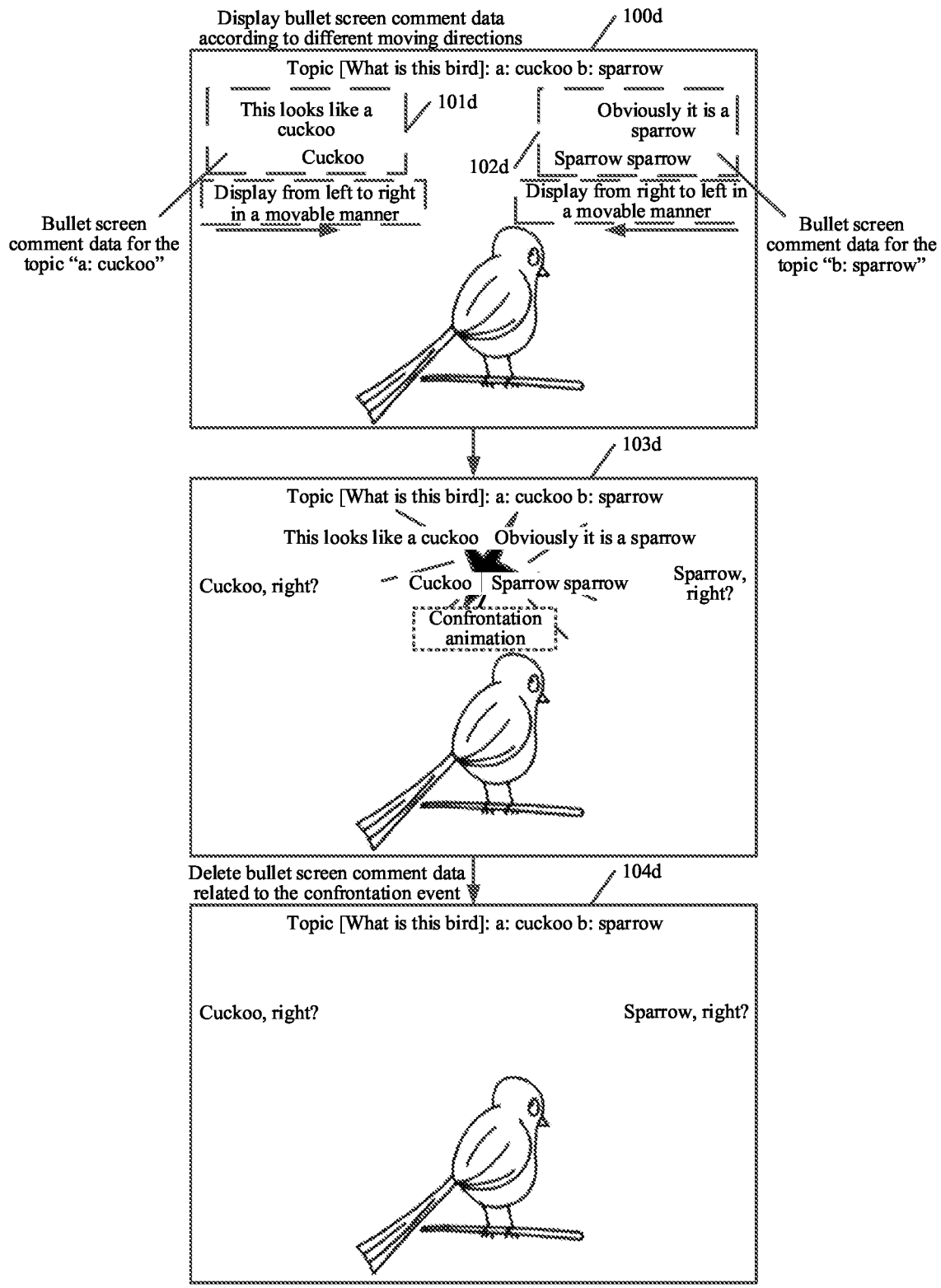
FIG. 5 is a schematic diagram of an interface of displaying bullet screen comment data in a confrontation manner according to an embodiment of the present application.

FIG. 5 is a schematic diagram of an interface of displaying bullet screen comment data in a confrontation manner according to an embodiment of the present application. As shown in FIG. 5, an interface 100d, an interface 103d, and an interface 104d may all be interactive interfaces at different moments, the target scenario may be a topic interaction scenario, and a topic in the topic interaction scenario may be "what is this bird". A first topic viewpoint in the topic interaction scenario may be "a: cuckoo", and a second topic viewpoint may be "b: sparrow". Box 101d displays bullet screen comment data for the topic viewpoint "a: cuckoo", and box 102d displays bullet screen comment data for the topic viewpoint "b: sparrow". The box 101d specifically includes the bullet screen comment data "this looks like a cuckoo" and the bullet screen comment data "cuckoo", and the box 102d specifically includes the bullet screen comment data "obviously it is a sparrow" and the bullet screen comment data "sparrow, sparrow".

A position at the left edge of the interface 100d may be the first initial position, a position at the right edge of the interface 100d may be the second initial position, the first moving direction may be a left-to-right direction on the interactive interface, and the second moving direction may be a right-to-left direction on the interactive interface. Therefore, bullet screen comment data in box 101d may be displayed in a movable manner from the left edge of the interface 100d in a left-to-right direction, and bullet screen comment data in box 102d may be displayed in a movable manner from the right edge of the interface 100d in a right-to-left direction.

Furthermore, as shown in the interface 103d, when the bullet screen comment data of the first topic viewpoint "this looks like a cuckoo", the bullet screen comment data of the second topic viewpoint "obviously it is a sparrow", the bullet screen comment data of the first topic viewpoint "cuckoo", and the bullet screen comment data of the second topic viewpoint "sparrow, sparrow" are displayed at the same display position of the interface 103d and are in contact, the confrontation animation on the interface 103d may be displayed. Besides, the bullet screen comment data "this looks like a cuckoo", the bullet screen comment data "obviously it is a sparrow", the bullet screen comment data "cuckoo", and the bullet screen comment data "sparrow, sparrow" related to the confrontation trigger event may also be deleted on the interface 103d, as displayed on the interface 104d. The interface 104d is an interface after the bullet screen comment data "this looks like a cuckoo", the bullet screen comment data "obviously it is a sparrow", the bullet screen comment data "cuckoo", and the bullet screen comment data "sparrow, sparrow" are deleted.

In this embodiment of the present application, the method may include: displaying an interactive interface of a target scenario; displaying, on the interactive interface, dynamic movements of a first bullet screen comment set moving in a first moving direction and a second bullet screen comment set moving in a second moving direction; First bullet screen comment set includes N pieces of first bullet screen comment data. The second bullet screen comment set includes M pieces of second bullet screen comment data. N and M are integers. The first moving direction and the second moving direction are different moving directions. It may be seen that according to the method proposed in this embodiment of the present application, the bullet screen comment data is classified, for example, into the first bullet screen comment data and the second bullet screen comment data, and then the first bullet screen comment data and the second bullet screen comment data may be displayed in a movable manner on the interactive interface according to different moving directions, which increases display manners of the bullet screen comment data and improves display interest of the bullet screen comment data.

Figure 6:
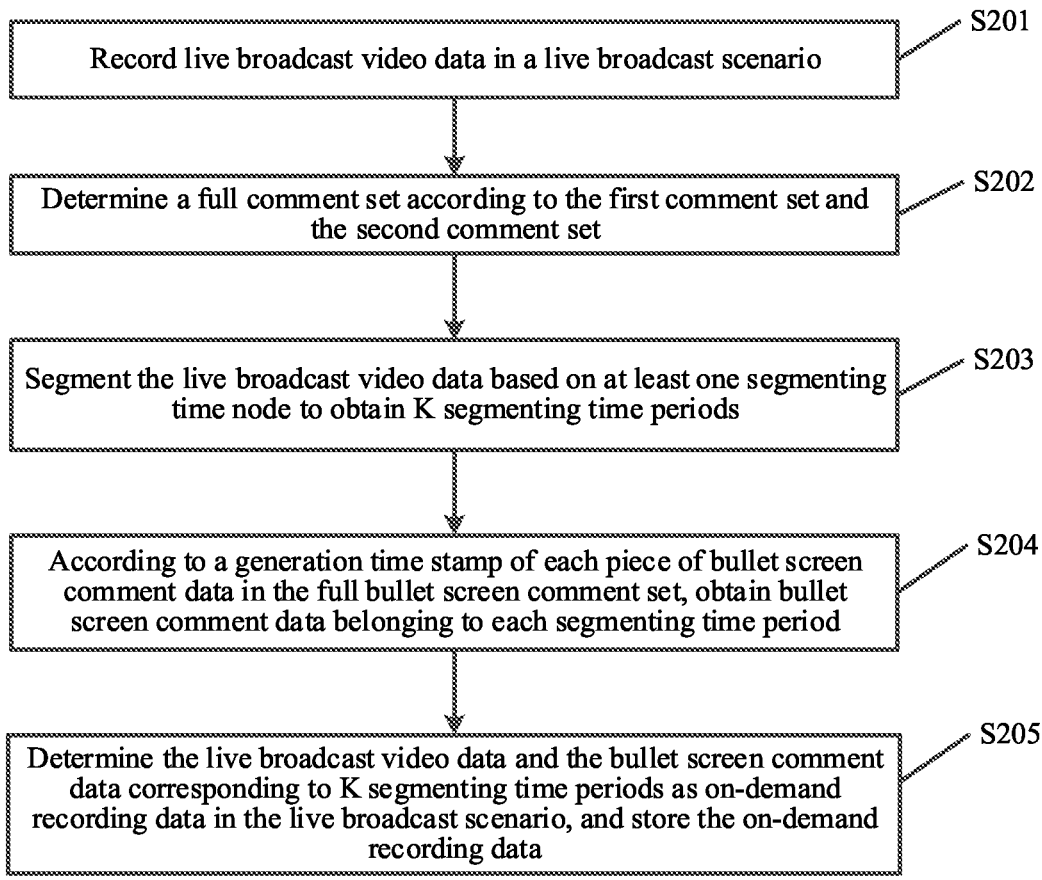
FIG. 6 is a schematic flowchart of data recording on-demand broadcast according to an embodiment of the present application.

FIG. 6 is a schematic flowchart of data recording on-demand broadcast according to an embodiment of the present application. As shown in FIG. 6, the method may include step S201 to step S205.

Step S201: Record live broadcast video data in the live broadcast scenario.

As an example, an execution entity in the embodiment of the present application may also be a terminal device, the interactive interface may be a live broadcast interface, and the live broadcast interface may display live broadcast video images during live broadcast. The terminal device may record live broadcast video data in the live broadcast scenario, to obtain the live broadcast video data in the live broadcast scenario.

Step S202: Determine a full bullet screen comment set according to the first bullet screen comment set and the second bullet screen comment set. Bullet screen comment data in the full bullet screen comment set includes the N pieces of first bullet screen comment data and the M pieces of second bullet screen comment data.

As an example, the terminal device may obtain a full bullet screen comment set through the first bullet screen comment set and the second bullet screen comment set, and the full bullet screen comment set may include all the first bullet screen comment data and the second bullet screen comment data. It may be understood that, when the first bullet screen comment set and the second bullet screen comment set are obtained and aggregated according to a fragmenting time node, the full bullet screen comment set may include the first bullet screen comment set and the second bullet screen comment set obtained and aggregated in each fragmenting time node.

Step S203: Segment the live broadcast video data based on at least one fragmenting time node to obtain K fragmenting time periods, where K is an integer greater than 1.

Step S204: According to a generation timestamp of each piece of bullet screen comment data in the full bullet screen comment set, obtain bullet screen comment data belonging to each fragmenting time period.

The terminal device may also store the bullet screen comment data in the full bullet screen comment set in a fragmenting manner according to the fragmenting time node, that is, bullet screen comment data is stored and recorded once for one fragmenting time node. The fragmenting time node for obtaining the first bullet screen comment set and the second bullet screen comment set may be different from the fragmenting time node for recording and storing the bullet screen comment data in the full bullet screen comment set in a fragmenting manner. For example, every 1 s (second) may be used as a fragmenting time node to store the bullet screen comment data in the full bullet screen comment set in a fragmenting manner.

It is understandable that since the bullet screen comment data in the full bullet screen comment set is obtained in a process rather than at the same time, in storing the bullet screen comment data in the full bullet screen comment set in a fragmenting manner, the bullet screen comment data obtained first may be stored in real time in a fragmenting manner in a process of obtaining the full bullet screen comment set, or the bullet screen comment data may be stored in a fragmenting manner after the full bullet screen comment set is obtained.

The terminal device may store the bullet screen comment data in the full bullet screen comment set in a fragmenting manner according to a generation timestamp of each bullet screen comment data in the full bullet screen comment set. After the bullet screen comment data in the full bullet screen comment set is stored in a fragmenting manner, bullet screen comment data corresponding to K fragmenting time periods corresponding to each fragmenting time node may be obtained. A fragmenting time node may correspond to a fragmenting time period, for example, a fragmenting time period may be 1 s, and bullet screen comment data corresponding to a fragmenting time period may be bullet screen comment data generated during 1 second corresponding to the fragmenting time period. K is a positive integer, and a specific value of K is determined according to an actual application scenario. For example, if live broadcast video data has a total of 1000 s, K may be equal to 1000, that is, 1000 fragmenting time periods of 1 s are included.

Step S205: Determine the live broadcast video data and the bullet screen comment data corresponding to K fragmenting time periods as on-demand recording data in the live broadcast scenario, and store the on-demand recording data.

The terminal device may use the live broadcast video data and the bullet screen comment data corresponding to the K fragmenting time periods as the on-demand recording data in the live broadcast scenario, and may store the on-demand recording data, and the terminal device may send the on-demand recording data to the server for storage, or the on-demand recording data may be directly recorded by the server, and then the server may directly store the recorded on-demand recording data.

Subsequently, when the terminal device detects an on-demand operation on the live broadcast video data, the terminal device may obtain the stored on-demand recording data, and obtain the live broadcast video data and bullet screen comment data of each fragment time period from the on-demand recording data.

Furthermore, the terminal device may play the live broadcast video data on the on-demand interface, and dynamically display, in chronological order, the bullet screen comment data of each fragmenting time period on the live broadcast video data played on the on-demand interface.

In addition, the same strategy of displaying bullet screen comment data according to different moving directions during live broadcast may be adopted, and the bullet screen comment data corresponding to the K fragmenting time periods may be displayed according to different moving directions on the on-demand interface. In the process of displaying bullet screen comment data corresponding to the K fragmenting time periods according to different moving directions, the first bullet screen comment data moving in the first moving direction and the second bullet screen comment data moving in the second moving direction may be displayed. Besides, if the first bullet screen comment data and the second bullet screen comment data are displayed at a same display position on the on-demand interface, the first bullet screen comment data and the second bullet screen comment data displayed at the same display position may also be deleted and a confrontation animation is displayed.

In addition, in a process of on-demand broadcast of live broadcast video data, a number of pieces of bullet screen comment data of each bullet screen comment type may also be counted periodically, so that a bullet screen comment confrontation result may also be periodically displayed on the on-demand interface (such as display of the bullet screen comment confrontation victory information of the first match team, the bullet screen comment confrontation victory information of the second match team, or the bullet screen comment confrontation tie information of the first match team and the second match team). In this way, a live broadcast image on the interactive interface of the live broadcast process may be the same as an on-demand image on the on-demand interface of the on-demand process, and display of the live broadcast video data and bullet screen comment data in the live broadcast process may be restored in the on-demand process.

Figure 7:
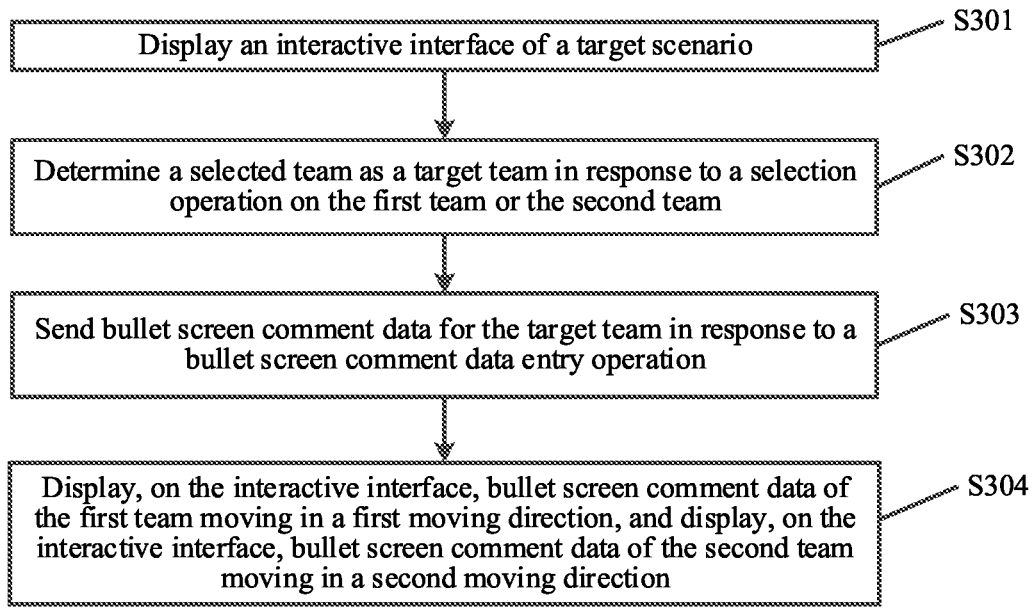
FIG. 7 is a schematic flowchart of a bullet screen comment sending method according to an embodiment of the present application.

FIG. 7 is a schematic flowchart of a bullet screen comment sending method according to an embodiment of the present application. As shown in FIG. 7, the method may include step S301 to step S304.

Step S301: Display an interactive interface of a target scenario, where the target scenario includes a first team and a second team.

As an example, content described in this embodiment of the present application may be combined with that in the embodiment of the application corresponding to FIG. 3, and the execution entity in this embodiment of the present application may also be a terminal device. Both the first team and the second team may be teams corresponding to any bullet screen comment type. The first team and the second team are different teams. For example, the first team may be the first match team, and the second team may be the second match team, or the first team may be a team corresponding to the first topic viewpoint in the topic interaction scenario, and the second team may be a team corresponding to the second topic viewpoint in the topic interaction scenario. The target scenario may include a plurality of bullet screen comment types, and the first team and the second team may be teams corresponding to any two bullet screen comment types in the plurality of bullet screen comment types. For the specific description of the target scenario and the interactive interface, reference may be made to the specific description in the embodiment corresponding to FIG. 3.

Step S302: Determine a selected team as a target team in response to a selection operation on the first team or the second team.

As an example, the terminal device may display a team selection list (such as a match team selection list), and the team selection list may be on the interactive interface, or may be on a sub-interface (such as a floating window interface) independently displayed on the interactive interface. The team selection list may include the first team and the second team, and the terminal device may use the team selected by the user as the target team according to the user's selection operation on the first team or the second team in the team selection list. The target team may be the first team or the second team.

Step S303: Send bullet screen comment data for the target team in response to a bullet screen comment data entry operation.

Step S304: Display, on the interactive interface, bullet screen comment data of the first team moving in a first moving direction, and display, on the interactive interface, bullet screen comment data of the second team moving in a second moving direction.

The bullet screen comment type of the first bullet screen comment data is different from the bullet screen comment type of the second bullet screen comment data, and the bullet screen comment data is used to comment on the target scenario.

As an example, the terminal device may obtain, on the interactive interface, the bullet screen comment data entered by the user, may use the entered bullet screen comment data as the bullet screen comment data for the target team, and may send the entered bullet screen comment data on the interactive interface. For example, after the entered bullet screen comment data is sent to a background server for aggregation of bullet screen comment data, the entered bullet screen comment data may be displayed on the interactive interface.

As an example, the terminal device may obtain, on another interface independent of the interactive interface, the bullet screen comment data entered by the user, may use the entered bullet screen comment data as the bullet screen comment data for the target team, and may send the entered bullet screen comment data on the another interface. For example, after the entered bullet screen comment data is sent to a background server for aggregation of bullet screen comment data, the entered bullet screen comment data may be displayed on the interactive interface.

Bullet screen comment data of the first team may be displayed in a movable manner on the interactive interface in a first moving direction, and bullet screen comment data of the second team moving may be displayed in a second moving direction. The bullet screen comment data of the target team may not only include the bullet screen comment data entered by the user, but also include bullet screen comment data for the target team entered by other users on other terminal devices. For example, the bullet screen comment data of the first team may include the first bullet screen comment data in the first bullet screen comment set, and the bullet screen comment data of the second team may include the second bullet screen comment data in the second bullet screen comment set. For how to display the bullet screen comment data of the first team and the bullet screen comment data of the second team, reference may be made to the specific description in the embodiment corresponding to FIG. 3.

According to the method provided by this embodiment of the present application, the user may select a team that the user supports, to send bullet screen comment data, and then the bullet screen comment data entered by the user may be displayed in a movable manner according to a bullet screen comment display direction (such as the first moving direction or the second moving direction) corresponding to the team that the user supports.

Figure 8:
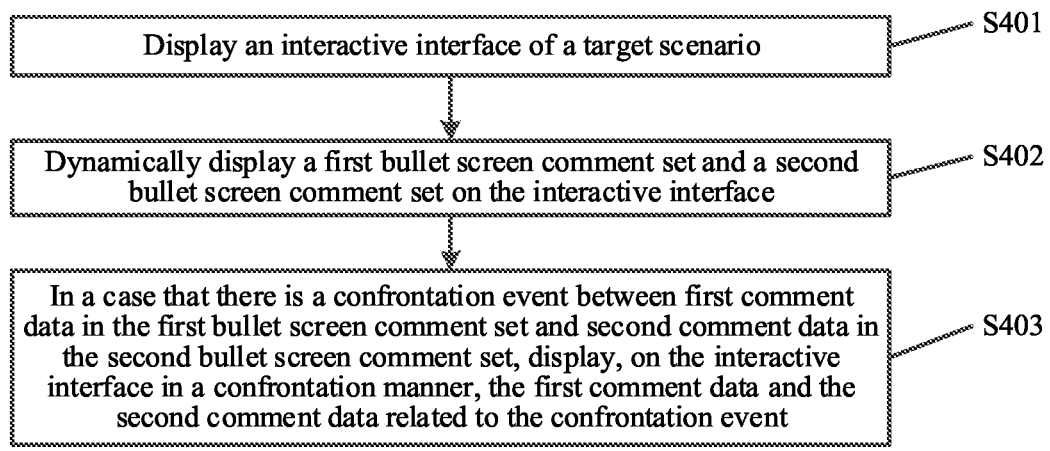
FIG. 8 is a schematic flowchart of a bullet screen comment display method according to an embodiment of the present application.

FIG. 8 is a schematic flowchart of a bullet screen comment display method according to an embodiment of the present application. As shown in FIG. 8, the method may include step S401 to step S403.

Step S401: Display an interactive interface of a target scenario.

As an example, the content described in the embodiment of the present application may be combined with that in the embodiment corresponding to FIG. 3 and that in the embodiment corresponding to FIG. 7, and the execution entity in this embodiment of the application may also be a terminal device. For the specific description of the target scenario and the interactive interface, reference may be made to the description in the embodiment corresponding to FIG. 3.

Step S402: Dynamically display a first bullet screen comment set and a second bullet screen comment set on the interactive interface.

The first bullet screen comment set includes N pieces of first bullet screen comment data, the second bullet screen comment set includes M pieces of second bullet screen comment data, bullet screen comment types of the first bullet screen comment data and the second bullet screen comment data are different, the bullet screen comment data is used to comment on the target scenario, and N and M are positive integers.

As an example, the manner of dynamically displaying the first bullet screen comment set and the second bullet screen comment set on the interactive interface may include: displaying the first bullet screen comment data in the first bullet screen comment set in a movable manner according to the first moving direction, and displaying the second bullet screen comment data in the second bullet screen comment set in a movable manner according to the second moving direction.

The interactive interface may further include a first display area and a second display area, and the first display area and the second display area may be two non-intersecting areas on the interactive interface. Therefore, the manner in which the terminal device dynamically displays the first bullet screen comment set and the second bullet screen comment set may also be: the terminal device may sequentially display the N pieces of first bullet screen comment data in the first display area in a superimposed manner according to the order of the generation timestamps of the N pieces of first bullet screen comment data in the first bullet screen comment set, for example, display 1 piece of first bullet screen comment data→display 2 pieces of first bullet screen comment data→display 3 pieces of first bullet screen comment data. Similarly, the terminal device may sequentially display the M pieces of second bullet screen comment data in the second display area in a superimposed manner according to the order of the generation timestamps of the M pieces of second bullet screen comment data in the second bullet screen comment set, for example, display 1 piece of second bullet screen comment data→display 2 pieces of second bullet screen comment data→display 3 pieces of second bullet screen comment data.

Step S403: When there is a confrontation trigger event between the first bullet screen comment data in the first bullet screen comment set and the second bullet screen comment data in the second bullet screen comment set, trigger a confrontation display event between the first bullet screen comment data and the second bullet screen comment data related to the confrontation trigger event.

As an example, the confrontation trigger event may indicate that a confrontation display event between the first bullet screen comment data and the second bullet screen comment data is triggered during the dynamic display of the first bullet screen comment data and the second bullet screen comment data (for example, display of the bullet screen comment data is counteracted, or a confrontation animation is displayed). In other words, the confrontation trigger event indicates a display manner of the first bullet screen comment data and the second bullet screen comment data that may trigger the confrontation display event. Therefore, the confrontation trigger event may be set according to an actual application scenario. The following is only examples of several confrontation trigger events, but is not limited to the following several confrontation trigger events.

As an example, any first bullet screen comment data in the first bullet screen comment set may be represented as first target bullet screen comment data, and any second bullet screen comment data in the second bullet screen comment set may be represented as second target bullet screen comment data. In a process of dynamically displaying the first target bullet screen comment data and the second target bullet screen comment data on the interactive interface (such as displaying the first bullet screen comment data in a movable manner from the first initial position according to the first moving direction, and displaying the second bullet screen comment data in a movable manner from the second initial position according to the second moving direction), when the first target bullet screen comment data and the second target bullet screen comment data are at a same display position of the interactive interface at a same moment (it may be understood as that the first target bullet screen comment data and the second target bullet screen comment data are in contact, such as being located at a same position on a same horizontal line of the interactive interface), it may be considered that there is a confrontation trigger event between the first target bullet screen comment data and the second target bullet screen comment data. In the confrontation display event, a confrontation animation may be displayed. Therefore, the confrontation animation may be displayed on the interactive interface at this time. The confrontation animation may be a confrontation special effect. The confrontation special effect may be a collision special effect between the first target bullet screen comment data and the second target bullet screen comment data, and a specific form of the confrontation animation may also be set according to an actual application scenario. Alternatively, the confrontation display event may also be a display counteracting event. Therefore, in this case, the displayed first target bullet screen comment data and second target bullet screen comment data may be deleted from the interactive interface, that is, display of the first target bullet screen comment data and the second target bullet screen comment data may be counteracted.

As an example, a maximum number of pieces of bullet screen comment data that may be displayed in the first display area and the second display area on the interactive interface may be L. L is a positive integer, and L may be specifically determined according to an actual application scenario. For example, L may be 10. A speed of displaying the first bullet screen comment data in the first display area in a superimposed manner may be the same as a speed of displaying the second bullet screen comment data in the second display area in a superimposed manner. In other words, at a same moment, a number of pieces of first bullet screen comment data displayed in the first display area may be the same as a number of pieces of second bullet screen comment data displayed in the second display area. Therefore, in a process of sequentially displaying the first bullet screen comment data in the first display area in a superimposed manner and sequentially displaying the second bullet screen comment data in the second display area in a superimposed manner, when L pieces of first bullet screen comment data are displayed in the first display area and L pieces of second bullet screen comment data are displayed in the second display area, it is determined that there is a confrontation trigger event between the L pieces of first bullet screen comment data and the L pieces of second bullet screen comment data.

The confrontation display event may include displaying the confrontation animation (such as a confrontation special effect) on the interactive interface, and deleting the first bullet screen comment data and the second bullet screen comment data related to the confrontation trigger event. Therefore, the confrontation special effect may be displayed on the interactive interface, and the confrontation special effect at this time may be a counteracting special effect between the L pieces of first bullet screen comment data and the L pieces of second bullet screen comment data.

The terminal device may also delete the first bullet screen comment data and the second bullet screen comment data related to the confrontation trigger event from the interactive interface. Therefore, the confrontation animation may be a counteracting special effect between the first bullet screen comment data and the second bullet screen comment data that need to be deleted. For example, the first bullet screen comment data and the second bullet screen comment data related to the confrontation trigger event may include the first target bullet screen comment data and the second target bullet screen comment data. Alternatively, the first bullet screen comment data related to the confrontation trigger event may also include the L pieces of first bullet screen comment data and L pieces of second bullet screen comment data.

The timing for deleting the first bullet screen comment data and the second bullet screen comment data related to the confrontation trigger event may include: during the confrontation animation display, the first bullet screen comment data and the second bullet screen comment data related to the confrontation trigger event may be deleted from the interactive interface; or after the confrontation animation display is completed, the first bullet screen comment data and the second bullet screen comment data related to the confrontation trigger event may be deleted from the interactive interface; or before the confrontation animation display, the first bullet screen comment data and the second bullet screen comment data related to the confrontation trigger event may be deleted from the interactive interface.

Figure 9:
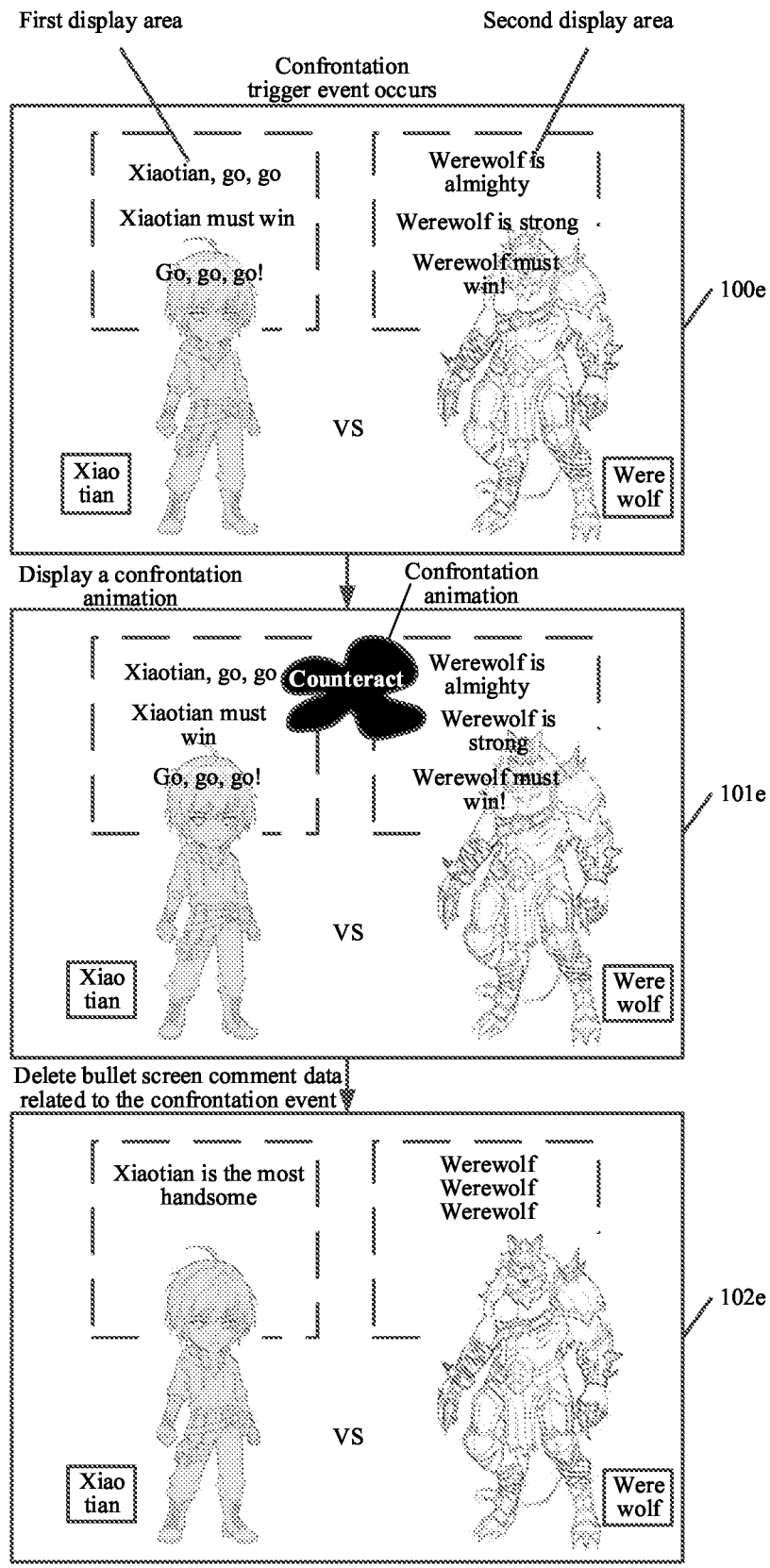
FIG. 9 is a schematic diagram of an interface of displaying bullet screen comment data in a confrontation manner according to an embodiment of the present application.

FIG. 9 is a schematic diagram of an interface of displaying bullet screen comment data in a confrontation manner according to an embodiment of the present application. An interface 100e, an interface 101e, and an interface 102e are all interactive interfaces at different moments. The target scenario may be a match live broadcast scenario (such as a game broadcast live scenario), Xiaotian may represent a first match team in the match live scenario, and Werewolf may represent a second match team in the match live broadcast scenario. The interface 100e includes a first display area and a second display area. Bullet screen comment data (such as the first bullet screen comment data) supporting Xiaotian may be displayed in the first display area, and bullet screen comment data (such as the second bullet screen comment data) supporting Werewolf may be displayed in the second display area. N pieces of first bullet screen comment data may be sequentially displayed in a superimposed manner in the first display area. For example, the first bullet screen comment data "Xiaotian, go, go" may be first displayed in the first display area, and the second bullet screen comment data "Werewolf is mighty" may be displayed synchronously in the second display area. Then, the first bullet screen comment data "Xiaotian must win" may be displayed below the first bullet screen comment data "Xiaotian, go, go", and the second bullet screen comment data "Werewolf is strong" may be displayed synchronously below the second bullet screen comment data "Werewolf is mighty". Then, the first bullet screen comment data "go, go!" may be displayed below the first bullet screen comment data "Xiaotian must win", and the second bullet screen comment data "Werewolf must win" is synchronously displayed below "Werewolf is strong". In this way, the interface 100e may be displayed.

Assuming that L is equal to 3, in display on the interface 100e, the number of pieces of bullet screen comment data displayed in the first display area and the second display area has reached the maximum value. This means that there is a confrontation trigger event between the three pieces of bullet screen comment data in the first display area (including the first bullet screen comment data "Xiaotian, go, go", the first bullet screen comment data "Xiaotian must win", and the first bullet screen comment data "go, go!") and the three pieces of second bullet screen comment data in the second display area (including the second bullet screen comment data "Werewolf is mighty", the second bullet screen comment data "Werewolf is strong", and the second bullet screen comment data "Werewolf must win"), which may be displayed on the interface 101e. Besides, the confrontation animation on the interface 101e is displayed. Then, the bullet screen comment data related to the confrontation trigger event may be deleted from the interface 101e, that is, the three pieces of first bullet screen comment data displayed in the first display area and the three pieces of second bullet screen comment data displayed in the second display area are deleted, as displayed on the interface 102e. On the interface 102e, the three pieces of first bullet screen comment data and the three pieces of second bullet screen comment data are deleted. The first bullet screen comment data "Xiaotian is the most handsome" next to the first bullet screen comment data "go, go!" is then displayed in the first display area, and the second bullet screen comment data "Werewolf, Werewolf, Werewolf" next to the second bullet screen comment data "Werewolf must win" is then displayed in the second display area.

Figure 10A:
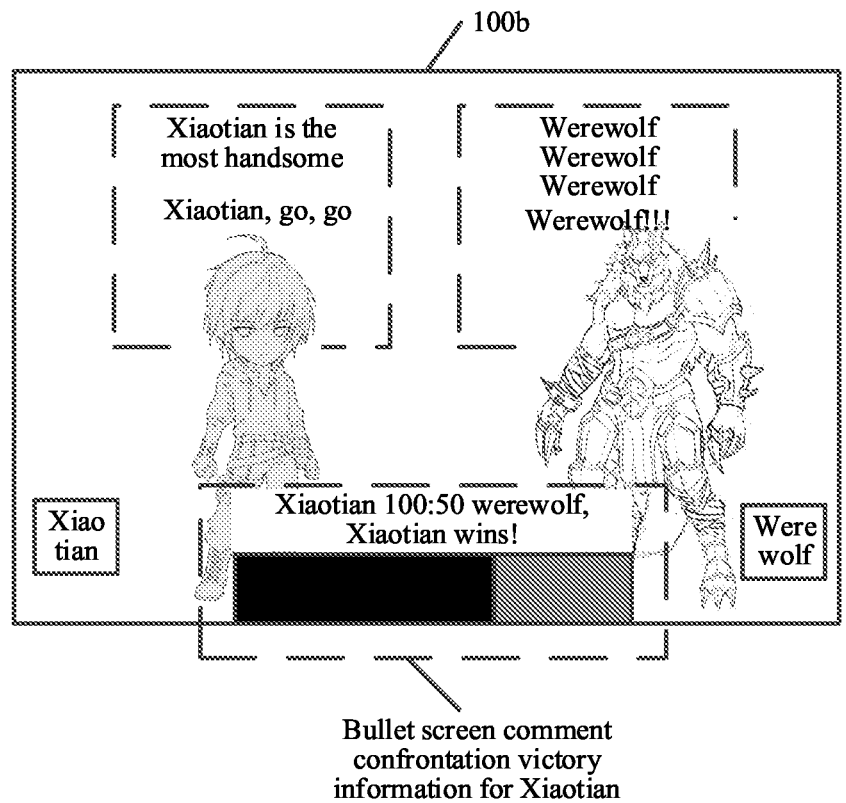
FIG. 10a to FIG. 10c are schematic diagrams of a scenario of displaying bullet screen comment confrontation information according to an embodiment of the present application.
Figure 10B:
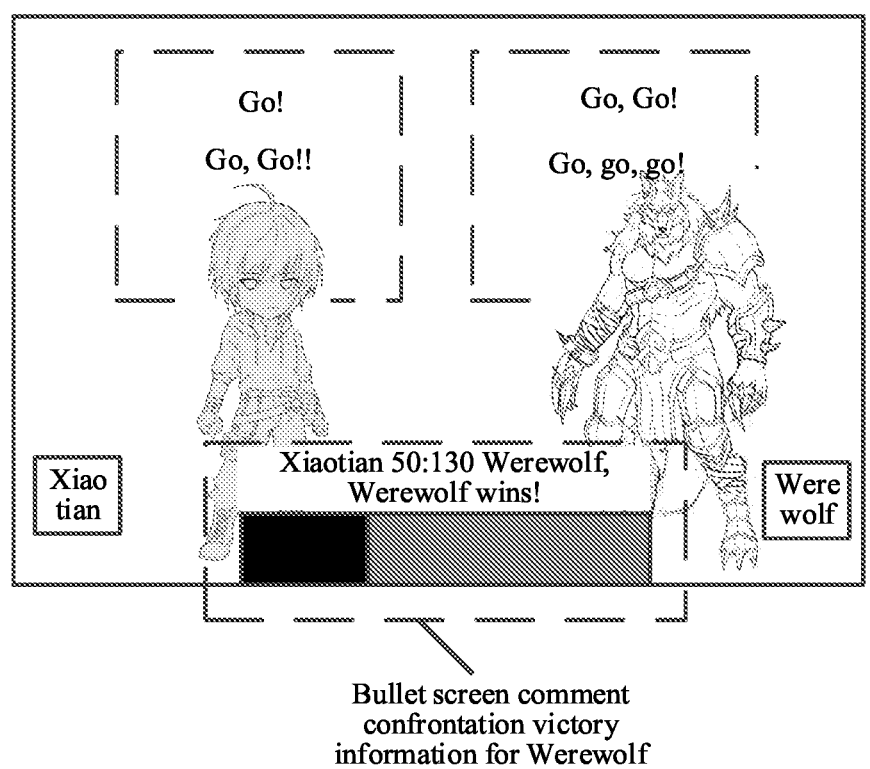

FIG. 10a to FIG. 10b are schematic diagrams of a scenario of displaying bullet screen comment confrontation information according to an embodiment of the present application. As shown in FIG. 10a, when there are 100 pieces of bullet screen comment data supporting Xiaotian and 50 pieces of bullet screen comment data supporting Werewolf in a period corresponding to a period node, at a moment corresponding to the period node, the bullet screen comment confrontation victory information for Xiaotian may be displayed, and the bullet screen comment confrontation victory information includes the prompt message "Xiaotian 100:50 Werewolf, Xiaotian wins!".

As shown in FIG. 10b, when there are 50 pieces of bullet screen comment data supporting Xiaotian and 130 pieces of bullet screen comment data supporting Werewolf in a period corresponding to a period node, at a moment corresponding to the period node, the bullet screen comment confrontation victory information for Werewolf may be displayed, and the bullet screen comment confrontation victory information includes the prompt message "Xiaotian 50:130 Werewolf, Werewolf wins!".

Figure 10C:
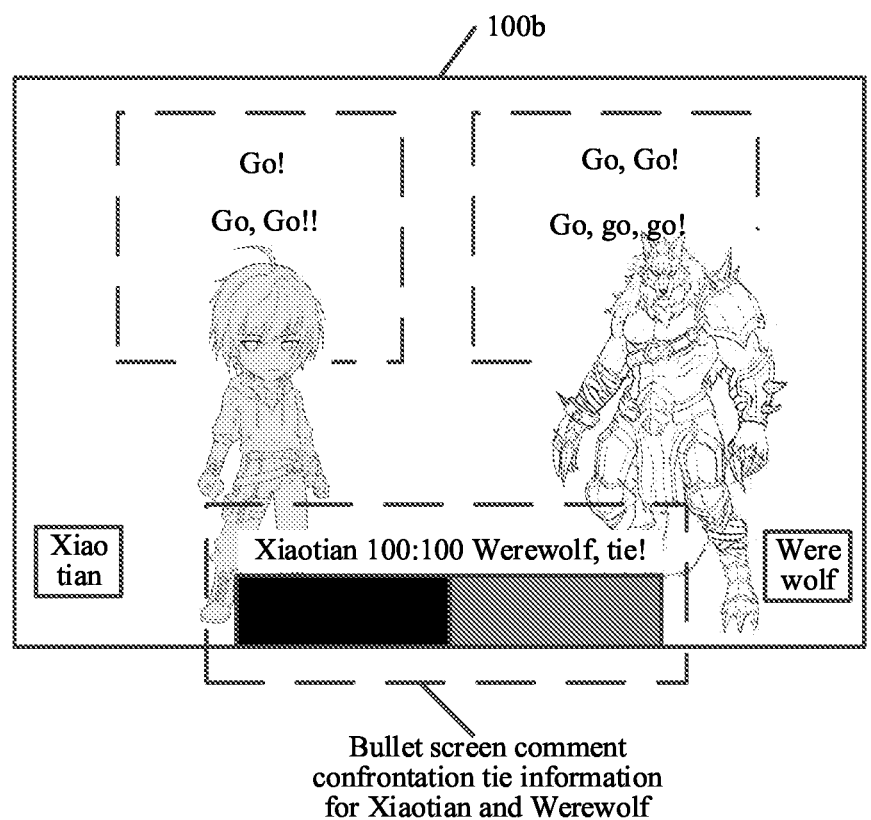

As shown in FIG. 10c, when there are 100 pieces of bullet screen comment data supporting Xiaotian and 100 pieces of bullet screen comment data supporting Werewolf in a period corresponding to a period node, at a moment corresponding to the period node, the bullet screen comment confrontation tie information for Xiaotian and Werewolf may be displayed, and the bullet screen comment confrontation tie information includes the prompt message "Xiaotian 100:100 Werewolf, tie!".

According to the method provided in this embodiment of the present application, the bullet screen comment data in the target scenario is classified into bullet screen comment data of various bullet screen comment types, and then when the bullet screen comment data of the plurality of bullet screen comment types is dynamically displayed, the confrontation display between the bullet screen comment data of the various bullet screen comment types may be triggered (such as confrontation display of counteracting, which may be reflected by the confrontation animation and deleting the bullet screen comment data related to the confrontation trigger event), so as to enhance the fun of interaction between users, cultivate a good interactive atmosphere, increase the viewing time of users, and improve business benefits (for example, when a supported bullet screen comment type is selected to comment, a number of gold coins needs to be deducted).

In this embodiment of the present application, the method may include: displaying an interactive interface of a target scenario; dynamically displaying a first bullet screen comment set and a second bullet screen comment set on the interactive interface; where first bullet screen comment set includes N pieces of first bullet screen comment data; the second bullet screen comment set includes M pieces of second bullet screen comment data; and N and M are integers; and when there is a confrontation trigger event between the first bullet screen comment data in the first bullet screen comment set and the second bullet screen comment data in the second bullet screen comment set, triggering a confrontation display event between the first bullet screen comment data and the second bullet screen comment data related to the confrontation trigger event. It can be seen that according to the method proposed in the embodiments of the present application, the first bullet screen comment data and the second bullet screen comment data may be dynamically displayed on the interactive interface. In the dynamic display process, if there is a confrontation trigger event between the first bullet screen comment data and the second bullet screen comment data, the confrontation display event between the first bullet screen comment data and the second bullet screen comment data related to the confrontation trigger event may be triggered (such as an event of counteracting the display or displaying the confrontation animation). Therefore, this increases display manners of the first bullet screen comment data and the second bullet screen comment data and improves the interactive interest between the bullet screen comment data.

Figure 11:
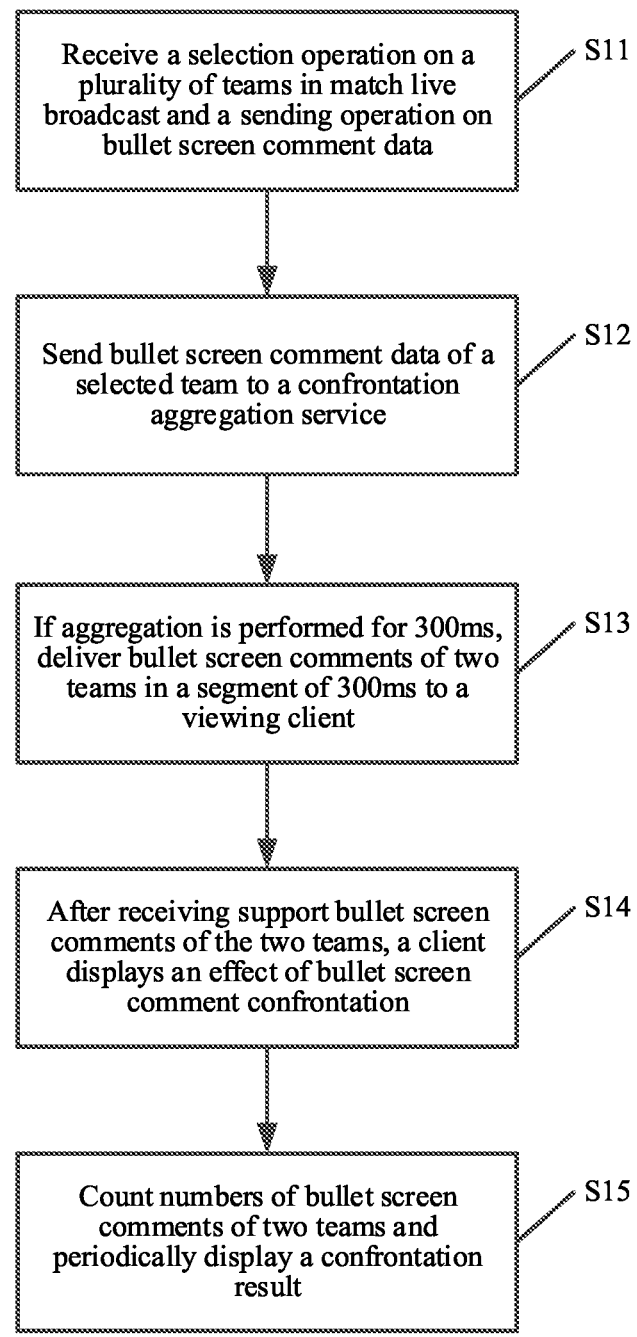
FIG. 11 is a schematic flowchart of displaying bullet screen comment data according to an embodiment of the present application.

FIG. 11 is a schematic flowchart of displaying bullet screen comment data according to an embodiment of the present application. The method includes step S11 to step S15.

Step S11: Receive a selection operation on a plurality of teams in match live broadcast and a sending operation on bullet screen comment data.

As an example, when a user watches match live broadcast and selects a supported team to send a support bullet screen comment, the user may select any one of a plurality of teams in the match live broadcast as a supported team when watching the match live broadcast, and send bullet screen comment data for the supported team.

Step S12: Send bullet screen comment data of a selected team to a confrontation aggregation service.

As an example, the confrontation aggregation service may be provided by a background server, and the bullet screen comment data sent by each user for the supported team may be sent to the background service for aggregation, that is, the bullet screen comment data is classified, for example, classified according to different teams.

Step S13: If aggregation is performed for 300 ms, deliver bullet screen comments of two teams in a fragment of 300 ms to a viewing client.

If the background server completes the aggregation of the bullet screen comment data within 300 ms, the aggregated bullet screen comment data of the two teams (including the host team and the guest team, such as the first match team and the second match team mentioned above) within the 300 ms may be sent to the viewing client.

In step S14: After receiving support bullet screen comments of the two teams, a client displays an effect of bullet screen comment confrontation.

After the client receives the aggregated bullet screen comment data of the two teams within 300 ms sent by the background server, the client may display the confrontation effect of the obtained bullet screen comment data on the client interface (such as the above-mentioned interactive interface). For a display manner, refer to the description in the embodiment corresponding to FIG. 3. For example, the manner of displaying the confrontation effect may be to counteract confrontation display of the first bullet screen comment data and the second bullet screen comment data that generate the confrontation trigger event.

Step S15: Count numbers of bullet screen comments of two teams and periodically display a confrontation result.

The client may also periodically count numbers (that is, quantities) of pieces of bullet screen comment data of the two teams, and periodically display the confrontation result. The confrontation result indicates a winning or losing status of popularity confrontation of the two teams. The team with a larger number of bullet screen comments is more popular, which is equivalent to winning in the popularity confrontation. For example, the confrontation result may be reflected by the bullet screen comment confrontation victory information of the first match team, the bullet screen comment confrontation victory information of the second match team, or the bullet screen comment confrontation tie information of the first match team and the second match team.

The target scenario may be a live broadcast scenario. The above process describes the process of displaying the bullet screen comment data in the live broadcast scenario. The following describes the process of recording and transferring the video data and bullet screen comment data in the live broadcast scenario and then performing on-demand broadcast. For description, refer to the following description of the embodiment corresponding to FIG. 12.

Figure 12:
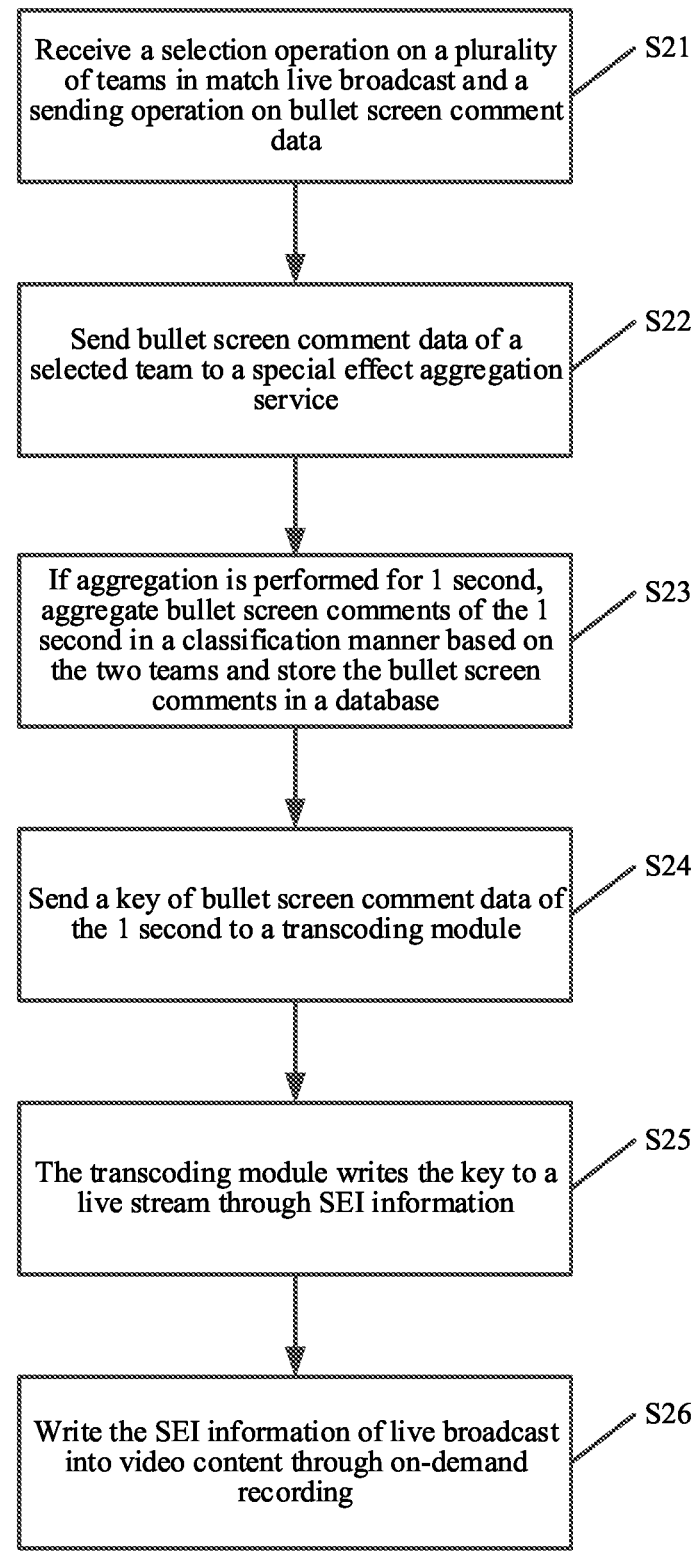
FIG. 12 is a schematic flowchart of data recording according to an embodiment of the present application.

FIG. 12 is a schematic flowchart of data recording according to an embodiment of the present application. This includes step 21 to step 26.

Step S21: Receive a selection operation on a plurality of teams in match live broadcast and a sending operation on bullet screen comment data.

As an example, when a user watches match live broadcast and selects a supported team to send a support bullet screen comment, the user may select any one of a plurality of teams in the match live broadcast as a supported team when watching the match live broadcast, and send bullet screen comment data for the supported team.

Step S22: Send bullet screen comment data of a selected team to a special effect aggregation service.

As an example, the confrontation aggregation service may be provided by a background server, and the bullet screen comment data sent by each user for the supported team may be sent to the background service for aggregation, that is, the bullet screen comment data is classified, for example, the data according to different teams is classified.

Step S23: If aggregation is performed for 1 second, aggregate bullet screen comments of the 1 second in a classification manner based on the two teams and store the bullet screen comments in a database, for example, key storage.

As an example, if the background server completes the aggregation of bullet screen comment data within 1 second, the bullet screen comment data of the two teams (that is, including the host team and the guest team, such as the first match team and the second match team) within the 1 second may be classified and aggregated. Classification and aggregation represent aggregation of bullet screen comment data of the host team, aggregation of bullet screen comment data of the guest team, and data storage in a database, for example, key storage (a distributed storage database).

Step S24: Send a key of bullet screen comment data of the 1 second to a transcoding module.

As an example, the background server may send a key of the 1-second bullet screen comment data to a transcoding module, and the transcoding module may be in another server. The key may refer to a timestamp indicated by a fragmenting time node corresponding to the 1 second. The key and the bullet screen comment data for kv storage correspond to each other.

Step S25: The transcoding module writes the key to a live stream through SEI information.

As an example, the transcoding module may write the obtained key into a live stream through SEI information (supplementary enhancement information), and the live stream may be a data stream during live broadcast.

Step S26: Write the SEI information of live broadcast into video content through on-demand recording.

As an example, during on-demand recording, the SEI information during the live broadcast may be written (that is, recorded) into the video content, that is, written into the live video data, and stored in association with the live video data.

Figure 13:
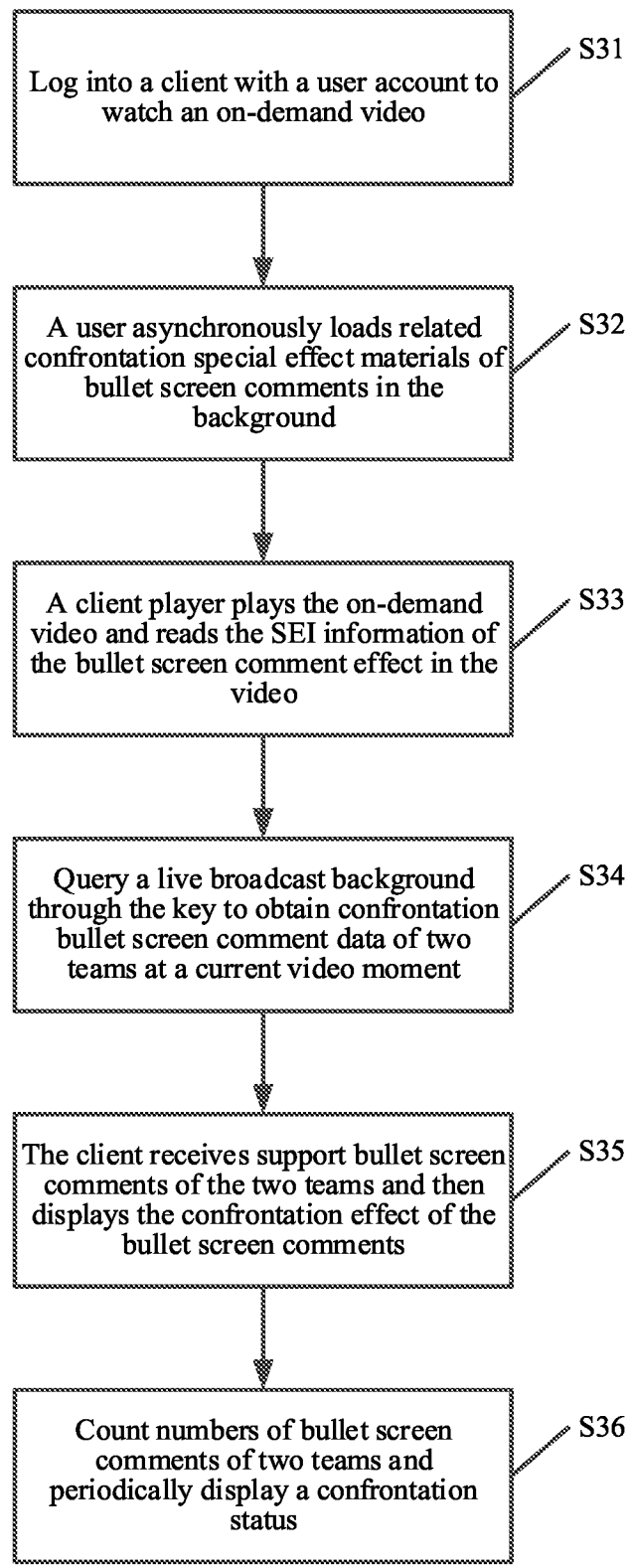
FIG. 13 is a schematic flowchart of data on-demand broadcast according to an embodiment of the present application.

FIG. 13 is a schematic flowchart of data on-demand broadcast according to an embodiment of the present application. This includes step S31 to step S36.

Step S31: Log into a client with a user account to watch an on-demand video.

Users may perform on-demand broadcast of videos in the client of the terminal device, and may perform on-demand broadcast of videos in a live video room, such as live video data and related bullet screen comment data recorded in the scenario of on-demand live broadcast.

Step S32: A user asynchronously loads related confrontation special effect materials of bullet screen comments in the background.

A client in the user's terminal device asynchronously loads related confrontation special effect materials of bullet screen comments in the background, and the confrontation special effect materials of bullet screen comments may be materials for displaying the confrontation animation.

Step S33: A client player plays the on-demand video and reads the SEI information of the bullet screen comment special effect in the video.

The client player in the terminal device may perform on-demand broadcast of a video and read the SEI information of the bullet screen comment special effect in the video. The SEI information is stored in the embodiment corresponding to FIG. 12.

Step S34: Query a live broadcast background through a key to obtain confrontation bullet screen comment data of two teams at a current video moment.

As an example, the terminal device may request the server to correspondingly query the bullet screen comment data of the two teams at the current video moment for kv storage through the key in the SEI information, and the server may send the queried bullet screen comment data to the client.

In step S35: After receiving support bullet screen comments of the two teams, the client displays an effect of bullet screen comment confrontation.

As an example, after the client receives the bullet screen comment data of the two teams, the client may also display the bullet screen comment data in a confrontation manner in the same manner as the confrontation display of the bullet screen comment data during the live broadcast.

Step S36: Count numbers of bullet screen comments of the two teams and periodically display a confrontation status.

As an example, the client may also periodically count the numbers (that is, quantities) of bullet screen comments of the two teams in the same manner as the periodic display of the bullet screen comment confrontation status during the live broadcast, and periodically display the confrontation status. For example, the confrontation status may be reflected by the bullet screen comment confrontation victory information of the first match team, the bullet screen comment confrontation victory information of the second match team, or the bullet screen comment confrontation tie information of the first match team and the second match team.

Figure 14:
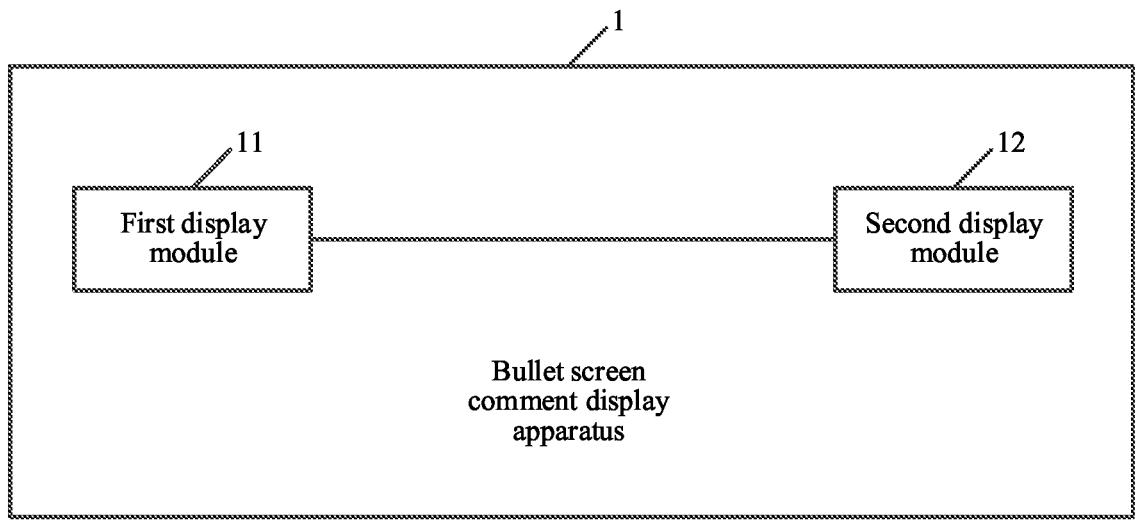
FIG. 14 is a schematic structural diagram of a bullet screen comment display apparatus according to an embodiment of the present application.

FIG. 14 is a schematic structural diagram of a bullet screen comment display apparatus according to an embodiment of the present application. The bullet screen comment display apparatus may be a computer program (including program code) running on a computer device, for example, the bullet screen comment display apparatus is application software, and the bullet screen comment display apparatus may be configured to execute corresponding steps of the method provided by the embodiments of the present application. As shown in FIG. 14, the bullet screen comment display apparatus 1 may include: a first display module 11 and a second display module 12.

The first display module 11 is configured to display an interactive interface of a target scenario.

The second display module 12 is configured to display, on the interactive interface, dynamic movements of a first bullet screen comment set moving in a first moving direction and a second bullet screen comment set moving in a second moving direction; where the first bullet screen comment set includes N pieces of first bullet screen comment data; the second bullet screen comment set includes M pieces of second bullet screen comment data; N and M are positive integers; and the first moving direction and the second moving direction are different moving directions and at least a first bullet screen comment in the first bullet screen comment set is on a trajectory of colliding with at least a second bullet screen comment in the second bullet screen comment set.

In some embodiments, the apparatus 1 is further configured to: when the first target bullet screen comment data and the second target bullet screen comment data are at a same display position of the interactive interface at a same moment, hide the first target bullet screen comment data and the second target bullet screen comment data on the interactive interface; where the first target bullet screen comment data is any one of the first bullet screen comment data, and the second target bullet screen comment data is any one of the second bullet screen comment data.

In some embodiments, the apparatus 1 is further configured to: when the first target bullet screen comment data and the second target bullet screen comment data are at a same display position of the interactive interface at a same moment, display a confrontation animal between the first target bullet screen comment data and the second target bullet screen comment data on the interactive interface; where the first target bullet screen comment data is any one of the first bullet screen comment data, and the second target bullet screen comment data is any one of the second bullet screen comment data.

In some embodiments, the target scenario is a match live broadcast scenario; the interactive interface is a match live broadcast interface in the match live broadcast scenario; the match live broadcast scenario includes a first match team and a second match team; the first bullet screen comment set is a bullet screen comment set for the first match team; and the second bullet screen comment set is a bullet screen comment set for the second match team.

In some embodiments, the N pieces of first bullet screen comment data and the M pieces of second bullet screen comment data are all bullet screen comment data obtained in a target period corresponding to a period node; and the apparatus 1 is further configured to:
  display bullet screen comment confrontation victory information for the first match team on the interactive interface when N is greater than M at a moment indicated by the period node;
  display bullet screen comment confrontation victory information for the second match team on the interactive interface when N is less than M at a moment indicated by the period node; and
  display bullet screen comment confrontation tie information for the first match team and the second match team on the interactive interface when N is equal to M at a moment indicated by the period node.

In some embodiments, the apparatus 1 is further configured to: before displaying, on the interactive interface, dynamic movements of a first bullet screen comment set moving in a first moving direction and a second bullet screen comment set moving in a second moving direction;
  display a match team selection list including the first match team and the second match team;
  obtain a selected match team in response to a selection operation on a target match team in the match team selection list;
  use entered bullet screen comment data as the first bullet screen comment data in the first bullet screen comment set when the target match team is the first match team; and
  use entered bullet screen comment data as the second bullet screen comment data in the second bullet screen comment set when the target match team is the second match team.

In some embodiments, the target scenario is a topic interaction scenario; the topic interaction scenario includes a first topic viewpoint and a second topic viewpoint; the first bullet screen comment set is a bullet screen comment set aimed at the first topic viewpoint; and the second bullet screen comment set is a bullet screen comment set aimed at the second topic viewpoint.

In some embodiments, when N is greater than a bullet screen comment display number threshold, the second display module 12 is further configured to:
  display, on the interactive interface, the first bullet screen comment data moving in the first moving direction;
  where the selected first bullet screen comment data is first bullet screen comment data that is sorted in front in a first sorting result and that meets the bullet screen comment display number threshold, and the first sorting result is a result obtained by sorting the N pieces of first bullet screen comment data according to an order of generation timestamps of the N pieces of first bullet screen comment data.

In some embodiments, when M is greater than a bullet screen comment display number threshold, the second display module 12 is further configured to:
  display, on the interactive interface, the selected second bullet screen comment data moving in the second moving direction;
  where the selected second bullet screen comment data is second bullet screen comment data that is sorted in front in a second sorting result and that meets the bullet screen comment display number threshold, and the second sorting result is a result obtained by sorting the M pieces of second bullet screen comment data according to an order of generation timestamps of the M pieces of second bullet screen comment data.

In some embodiments, the target scenario includes a live broadcast scenario; the apparatus 1 is further configured to:
  record live broadcast video data in the live broadcast scenario;
  determine a full bullet screen comment set according to the first bullet screen comment set and the second bullet screen comment set; where bullet screen comment data in the full bullet screen comment set includes the N pieces of first bullet screen comment data and the M pieces of second bullet screen comment data;
  fragment the live broadcast video data based on at least one fragmenting time node to obtain K fragmenting time periods, where K is an integer greater than 1;
  according to a generation timestamp of each piece of bullet screen comment data in the full bullet screen comment set, obtain bullet screen comment data belonging to each fragmenting time period; and determine the live broadcast video data and the bullet screen comment data of each fragmenting time period as on-demand recording data in the live broadcast scenario, and store the on-demand recording data.

In some embodiments, the apparatus 1 is further configured to:
  obtain the stored on-demand recording data when an on-demand operation for the live broadcast video data is detected;
  according to the obtained on-demand recording data, play the live broadcast video data on an on-demand interface, and dynamically display the bullet screen comment data of each fragmenting time period on the on-demand interface in chronological order; and
  in a process of dynamically displaying the bullet screen comment data of each of the K fragmenting time periods on the on-demand interface, display the first bullet screen comment data moving in the first moving direction and second bullet screen comment data moving in the second moving direction.

According to an embodiment of the present application, steps of the bullet screen comment display method shown in FIG. 3 may be performed by the modules of the bullet screen comment display apparatus shown in FIG. 12. For example, step S101 shown in FIG. 3 may be performed by the first display module 11 shown in FIG. 14, and step S102 shown in FIG. 3 may be performed by the second display module 12 shown in FIG. 14.

In this embodiment of the present application, the apparatus may display an interactive interface of a target scenario; display, on the interactive interface, dynamic movements of a first bullet screen comment set moving in a first moving direction and a second bullet screen comment set moving in a second moving direction; where first bullet screen comment set includes N pieces of first bullet screen comment data; the second bullet screen comment set includes M pieces of second bullet screen comment data; N and M are integers; and the first moving direction and the second moving direction are different moving directions and at least a first bullet screen comment in the first bullet screen comment set is on a trajectory of colliding with at least a second bullet screen comment in the second bullet screen comment set. It can be seen that the apparatus proposed in this embodiment of the present application classifies the bullet screen comment data, such as classifies the first bullet screen comment data and the second bullet screen comment data, and then may display the first bullet screen comment data and the second bullet screen comment data in a movable manner on the interactive interface according to different moving directions, which increases display manners of the bullet screen comment data and improves display interest of the bullet screen comment data.

According to an embodiment of the present application, each or all of the modules of the bullet screen comment display apparatus 1 shown in FIG. 14 may be combined into one or one or more units, or one (or more) of the units may be divided into a plurality of units of smaller functions. In this way, same operations may be implemented without affecting implementation of the technical effects of the embodiments of the present application. The foregoing modules are divided based on logical functions. In an actual application, a function of one module may be implemented by a plurality of units, or functions of a plurality of modules are implemented by one unit. In another embodiment of the present application, the bullet screen comment display apparatus may also include another unit. During practical application, these functions may also be cooperatively implemented by another unit and may be cooperatively implemented by a plurality of units.

According to an embodiment of the present application, a computer program (including program code) that can execute steps of the corresponding method shown in FIG. 3 may run on a general computing device of a computer including processing elements and storage elements such as a central processing unit (CPU), a random access memory (RAM), and a read-only memory (ROM), to construct the bullet screen comment display apparatus 1 shown in FIG. 14, and implement the bullet screen comment display method according to the embodiments of the present application. The computer program may be recorded in, for example, a computer-readable recording medium, and may be loaded into the foregoing computing device by using the computer-readable recording medium, and run in the computing device.

Figure 15:
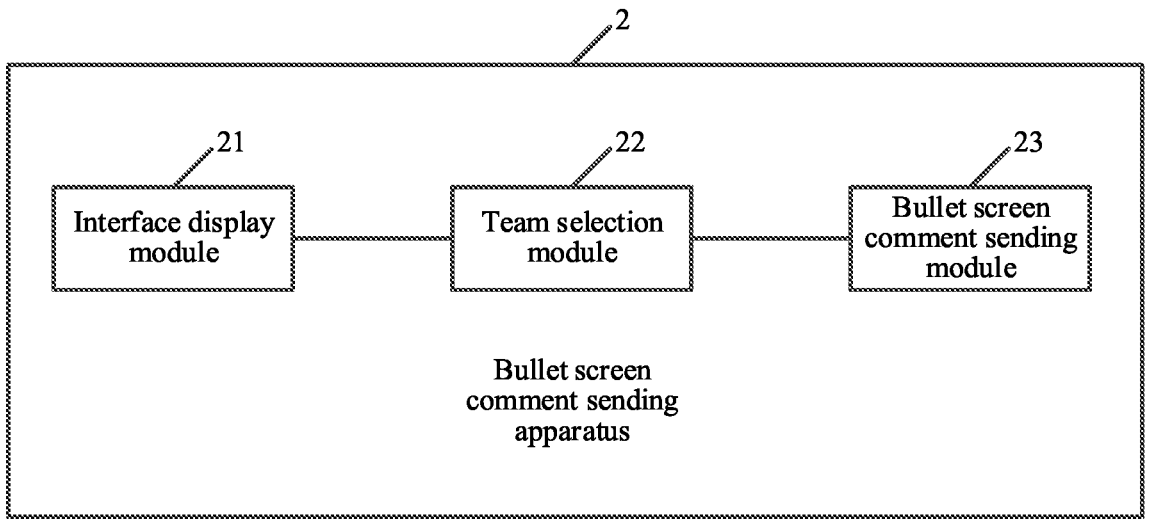
FIG. 15 is a schematic structural diagram of a bullet screen comment display apparatus according to an embodiment of the present application.

FIG. 15 is a schematic structural diagram of a bullet screen comment sending apparatus according to an embodiment of the present application. The bullet screen comment sending apparatus may be a computer program (including program code) running on a computer device, for example, the bullet screen comment sending apparatus is application software, and the bullet screen comment sending apparatus may be configured to execute corresponding steps of the method provided by the embodiments of the present application. As shown in FIG. 15, the bullet screen comment sending apparatus 2 may include: an interface display module 21, a team selection module 22, and a bullet screen comment sending module 23.

The interface display module 21 is configured to display an interactive interface of a target scenario; where the target scenario includes a first team and a second team.

The team selection module 22 is configured to determine a selected team as a target team in response to a selection operation on the first team or the second team.

The bullet screen comment sending module 23 is configured to send bullet screen comment data for the target team in response to a bullet screen comment data entry operation; and display, on the interactive interface, bullet screen comment data of the first team moving in a first moving direction, and display, on the interactive interface, bullet screen comment data of the second team moving in a second moving direction.

In some embodiments, the team selection module 22 is further configured to:
  displaying a team selection list; where the team selection list includes a first team and a second team; and
  using a selected team as a target team in response to a selection operation on the first team or the second team in the team selection list.

In some embodiments, the bullet screen comment sending module 23 is also configured to:
  obtain bullet screen comment data entered on the interactive interface, and send the entered bullet screen comment data as bullet screen comment data for the target team.

According to an embodiment of the present application, steps of the bullet screen comment sending method shown in FIG. 7 may be performed by the modules of the bullet screen comment sending apparatus 2 shown in FIG. 15. For example, step S301 shown in FIG. 7 may be performed by the interface display module 21 shown in FIG. 15, step S302 shown in FIG. 7 may be performed by the team selection module 22 shown in FIG. 15, and step S303 shown in FIG. 7 may be performed by the bullet screen comment sending module 23 shown in FIG. 15.

According to the apparatus provided by this embodiment of the present application, the user may select a team that the user supports, to send bullet screen comment data, and then the bullet screen comment data entered by the user may be displayed in a movable manner according to a bullet screen comment display direction (such as the first moving direction or the second moving direction) corresponding to the team that the user supports.

According to an embodiment of the present application, each or all of the modules of the bullet screen comment sending apparatus 2 shown in FIG. 15 may be combined into one or one or more units, or one (or more) of the units may be divided into a plurality of units of smaller functions. In this way, same operations may be implemented without affecting implementation of the technical effects of the embodiments of the present application. The foregoing modules are divided based on logical functions. In an actual application, a function of one module may be implemented by a plurality of units, or functions of a plurality of modules are implemented by one unit. In an embodiment of the present application, the bullet screen comment sending apparatus may also include another unit. During practical application, these functions may also be cooperatively implemented by another unit and may be cooperatively implemented by a plurality of units.

According to an embodiment of the present application, a computer program (including program code) that may execute steps of the corresponding method shown in FIG. 7 may run on a general computing device of a computer including processing elements and storage elements such as a central processing unit (CPU), a random access memory (RAM), and a read-only memory (ROM), to construct the bullet screen comment sending apparatus 2 shown in FIG. 15, and implement the bullet screen comment sending method according to the embodiments of the present application. The computer program may be recorded in, for example, a computer-readable recording medium, and may be loaded into the foregoing computing device by using the computer-readable recording medium, and run in the computing device.

Figure 16:
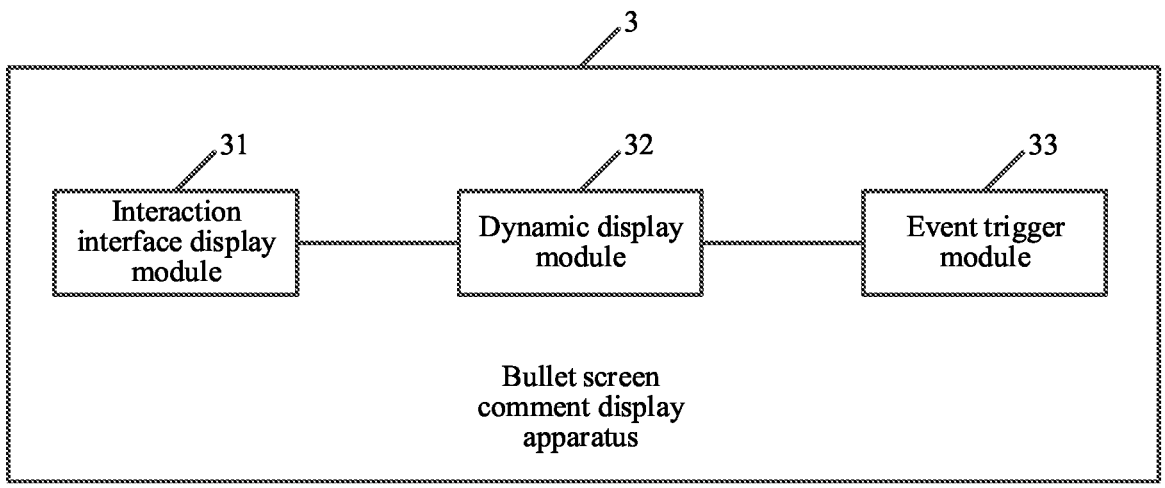
FIG. 16 is a schematic structural diagram of a bullet screen comment display apparatus according to an embodiment of the present application.

FIG. 16 is a schematic structural diagram of a bullet screen comment display apparatus according to an embodiment of the present application. The bullet screen comment display apparatus may be a computer program (including program code) running on a computer device, for example, the bullet screen comment display apparatus is application software, and the bullet screen comment display apparatus may be configured to execute corresponding steps of the method provided by the embodiments of the present application. As shown in FIG. 16, the bullet screen comment display apparatus 3 may include:

an interactive interface display module 31, configured to display an interactive interface of a target scenario;

a dynamic display module 32, configured to dynamically display a first bullet screen comment set and a second bullet screen comment set on the interactive interface; where first bullet screen comment set includes N pieces of first bullet screen comment data; and the second bullet screen comment set includes M pieces of second bullet screen comment data, bullet screen comment types of the first bullet screen comment data and the second bullet screen comment data are different, and N and M are positive integers; and an event trigger module 33, configured to: when there is a confrontation trigger event between the first bullet screen comment data in the first bullet screen comment set and the second bullet screen comment data in the second bullet screen comment set, trigger a confrontation display event between the first bullet screen comment data and the second bullet screen comment data related to the confrontation trigger event.

In some embodiments, the interactive interface includes a first display area and a second display area, and the dynamic display module 32 is further configured to:

sequentially displaying the N pieces of first bullet screen comment data in a superimposed manner in a first display area according to an order of generation timestamps of the N pieces of first bullet screen comment data; and sequentially displaying the M pieces of second bullet screen comment data in a superimposed manner in a second display area according to an order of generation timestamps of the M pieces of second bullet screen comment data.

In some embodiments, the event trigger module 33 is further configured to determine: when there are L pieces of first bullet screen comment data are displayed in the first display area and L pieces of second bullet screen comment data are displayed in the second display area, that there is a confrontation trigger event between the L pieces of first bullet screen comment data and the L pieces of second bullet screen comment data;

where L is a positive integer, and L is a maximum number of pieces of bullet screen comment data that may be displayed in the first display area or the second display area.

In some embodiments, a confrontation display event includes: displaying a confrontation animation on the interactive interface and deleting first bullet screen comment data and second bullet screen comment data related to the confrontation trigger event, which is equivalent to hiding the first bullet screen comment data and the second bullet screen comment data related to the confrontation trigger event on the interactive interface.

In some embodiments, a manner in which the apparatus 1 displays the confrontation animation on the interactive interface and deletes the first bullet screen comment data and the second bullet screen comment data related to the confrontation trigger event includes:

performing any one of the following processing:

during the confrontation animation display, deleting the first bullet screen comment data and the second bullet screen comment data related to the confrontation trigger event from the interactive interface (which is equivalent to hiding the first bullet screen comment data and the second bullet screen comment data related to the confrontation trigger event on the interactive interface during the confrontation animation display);

after the confrontation animation display is completed, deleting the first bullet screen comment data and the second bullet screen comment data related to the confrontation trigger event from the interactive interface (which is equivalent to hiding the first bullet screen comment data and the second bullet screen comment data related to the confrontation trigger event on the interactive interface after the confrontation animation display is completed); and before the confrontation animation display, deleting the first bullet screen comment data and the second bullet screen comment data related to the confrontation trigger event from the interactive interface (which is equivalent to hiding the first bullet screen comment data and the second bullet screen comment data related to the confrontation trigger event on the interactive interface before the confrontation animation display).

According to an embodiment of the present application, steps of the bullet screen comment display method shown in FIG. 8 may be performed by the modules of the bullet screen comment display apparatus 3 shown in FIG. 16. For example, step S401 shown in FIG. 8 may be performed by the interactive interface display module 31 shown in FIG. 16, step S401 shown in FIG. 8 may be performed by the dynamic display module 32 shown in FIG. 16, and step S403 shown in FIG. 8 may be performed by the event trigger module 33 shown in FIG. 16.

In this embodiment of the present application, the apparatus may display an interactive interface of a target scenario; dynamically display a first bullet screen comment set and a second bullet screen comment set on the interactive interface; where first bullet screen comment set includes N pieces of first bullet screen comment data; and the second bullet screen comment set includes M pieces of second bullet screen comment data; N and M are integers; and when there is a confrontation trigger event between the first bullet screen comment data in the first bullet screen comment set and the second bullet screen comment data in the second bullet screen comment set, trigger a confrontation display event between the first bullet screen comment data and the second bullet screen comment data related to the confrontation trigger event. It may be seen that according to the method proposed in the embodiments of the present application, the first bullet screen comment data and the second bullet screen comment data may be dynamically displayed on the interactive interface. In the dynamic display process, if there is a confrontation trigger event between the first bullet screen comment data and the second bullet screen comment data, the confrontation display event between the first bullet screen comment data and the second bullet screen comment data related to the confrontation trigger event may be triggered (such as an event of offsetting the display or displaying the confrontation animation). Therefore, this increases display manners of the first bullet screen comment data and the second bullet screen comment data and improves the interactive interest between the bullet screen comment data.

According to an embodiment of the present application, each or all of the modules of the bullet screen comment display apparatus 3 shown in FIG. 16 may be combined into one or one or more units, or one (or more) of the units may be divided into a plurality of units of smaller functions. In this way, same operations may be implemented without affecting implementation of the technical effects of the embodiments of the present application. The foregoing modules are divided based on logical functions. In an actual application, a function of one module may be implemented by a plurality of units, or functions of a plurality of modules are implemented by one unit. In another embodiment of the present application, the bullet screen comment display apparatus 3 may also include another unit. During practical application, these functions may also be cooperatively implemented by another unit and may be cooperatively implemented by a plurality of units.

According to an embodiment of the present application, a computer program (including program code) that may execute steps of the corresponding method shown in FIG. 3 may run on a general computing device of a computer including processing elements and storage elements such as a central processing unit (CPU), a random access memory (RAM), and a read-only memory (ROM), to construct the bullet screen comment display apparatus 3 shown in FIG. 16, and implement the bullet screen comment display method according to the embodiments of the present application. The computer program may be recorded in, for example, a computer-readable recording medium, and may be loaded into the foregoing computing device by using the computer-readable recording medium, and run in the computing device.

Figure 17:
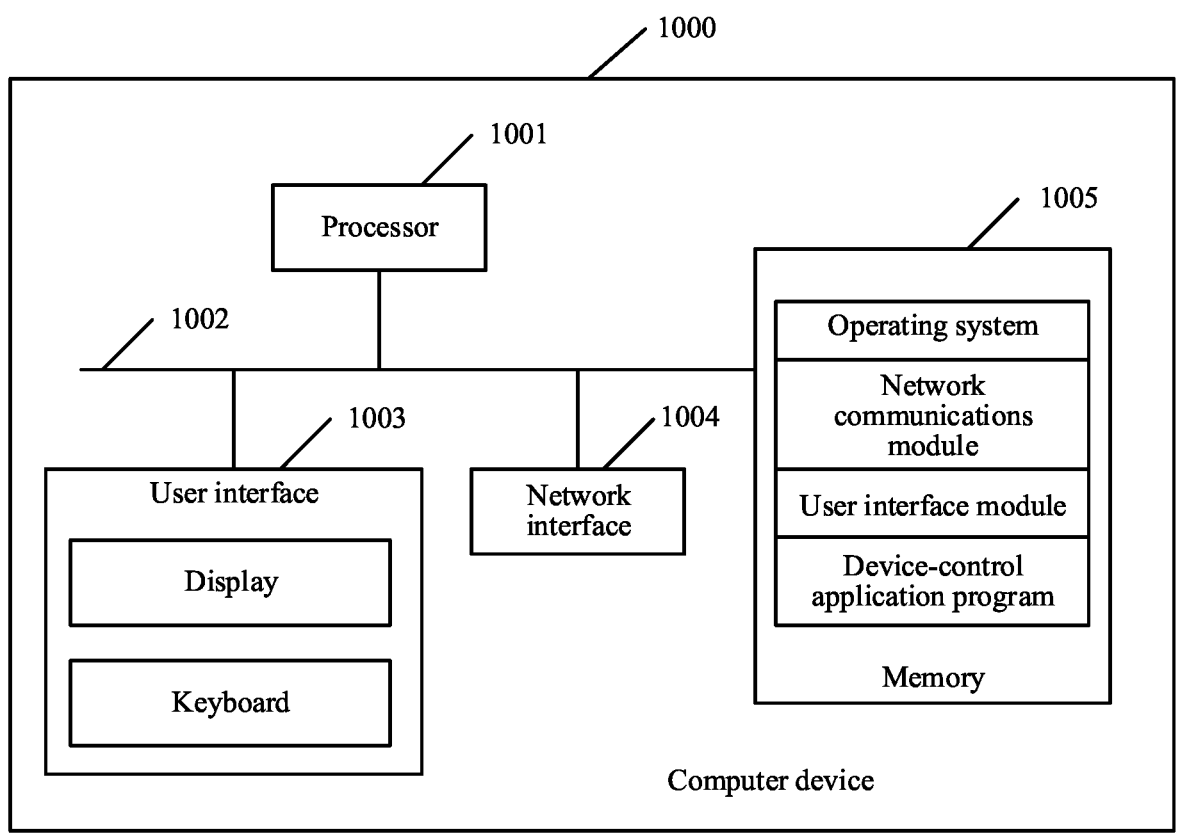
FIG. 17 is a schematic structural diagram of a computer device according to an embodiment of the present application.

FIG. 17 is a schematic structural diagram of a computer device according to an embodiment of the present application. As shown in FIG. 13, the computer device 1000 may include: a processor 1001, a network interface 1004, and a memory 1005, and in addition, the computer device 1000 may further include: a user interface 1003 and at least one communications bus 1002. The communications bus 1002 is configured to implement connection and communication between these components. The user interface 1003 may include a display and a keyboard. In some embodiments, the user interface 1003 may further include a standard wired interface and wireless interface. The network interface 1004 may include, for example, a standard wired interface and a standard wireless interface (such as a Wi-Fi interface). The memory 1005 may be a high-speed RAM memory, or may be a non-volatile memory, for example, at least one magnetic disk memory. The memory 1005 may alternatively be, for example, at least one storage apparatus located away from the processor 1001. As shown in FIG. 17, the memory 1005 used as a computer storage medium may include an operating system, a network communications module, a user interface module, and a device-control application program.

In the computer device 1000 shown in FIG. 17, the network interface 1004 may provide a network communication function. The user interface 1003 is mainly configured to provide an input interface for a user. The processor 1001 may be configured to invoke the device-control application program stored in the memory 1005, to perform the following operations:

displaying an interactive interface of a target scenario; and displaying, on the interactive interface, dynamic movements of a first bullet screen comment set moving in a first moving direction and a second bullet screen comment set moving in a second moving direction; where first bullet screen comment set includes N pieces of first bullet screen comment data; and the second bullet screen comment set includes M pieces of second bullet screen comment data; N and M are integers; and the first moving direction and the second moving direction are different moving directions and at least a first bullet screen comment in the first bullet screen comment set is on a trajectory of colliding with at least a second bullet screen comment in the second bullet screen comment set.

In a feasible implementation manner, the processor 1001 may be configured to invoke the device-control application program stored in the memory 1005, to perform the following operations:

displaying an interactive interface of a target scenario; where the target scenario includes a first team and a second team;

selecting a target team from the first team and the second team according to a team selection operation; and sending bullet screen comment data for the target team on the interactive interface;

where the bullet screen comment data of the first team is displayed on the interactive interface in a movable manner according to the first moving direction, and the bullet screen comment data of the second team is displayed on the interactive interface in a movable manner according to the second moving direction.

In a feasible implementation manner, the processor 1001 may be configured to invoke the device-control application program stored in the memory 1005, to perform the following operations:

displaying an interactive interface of a target scenario; and dynamically displaying a first bullet screen comment set and a second bullet screen comment set on the interactive interface; where first bullet screen comment set includes N pieces of first bullet screen comment data; and the second bullet screen comment set includes M pieces of second bullet screen comment data; N and M are integers; and when there is a confrontation trigger event between the first bullet screen comment data in the first bullet screen comment set and the second bullet screen comment data in the second bullet screen comment set, triggering a confrontation display event between the first bullet screen comment data and the second bullet screen comment data related to the confrontation trigger event.

It should be understood that the computer device 1000 described in this embodiment of the present application may implement the bullet screen comment display method in the foregoing embodiments corresponding to FIG. 3, the bullet screen comment sending method in the foregoing embodiments corresponding to FIG. 7, and the bullet screen comment display method in the foregoing embodiments corresponding to FIG. 8, and may also implement the bullet screen comment display apparatus 1 in the foregoing embodiments corresponding to FIG. 14, the bullet screen comment sending apparatus 2 in the foregoing embodiments corresponding to FIG. 15, and the bullet screen comment display apparatus 3 in the foregoing embodiments corresponding to FIG. 16. Details are not repeated herein. In addition, the description of beneficial effects of the same method are not described herein again.

The present application also provides a computer-readable storage medium, and the computer-readable storage medium stores computer programs executed by the bullet screen comment display apparatus 1, the bullet screen comment sending apparatus 2, and the bullet screen comment display apparatus 3. Besides, the computer programs include program instructions. When the processor executes the program instructions, the processor may implement the bullet screen comment display method in the foregoing embodiments corresponding to FIG. 3, the bullet screen comment sending method in the foregoing embodiments corresponding to FIG. 7, and the bullet screen comment display method in the foregoing embodiments corresponding to FIG. 8. Details are not repeated herein. In addition, the description of beneficial effects of the same method are not described herein again. For technical details that are not disclosed in the computer storage medium embodiments of the present application, refer to the descriptions of the method embodiments of the present application.

As an example, the program instructions may be deployed for execution on one computer device, or deployed for execution on a plurality of computer devices located at one location, or distributed on a plurality of computer devices distributed at a plurality of locations and interconnected through a communication network, where the plurality of computer devices distributed at a plurality of locations and interconnected through a communication network may form a blockchain network.

The computer-readable storage medium may be the bullet screen comment display apparatus and the bullet screen comment sending apparatus provided by any one of the foregoing embodiments or an internal storage unit of the computer device, such as a hard disk or a memory of the computer device. The computer-readable storage medium may also be an external storage device of the computer device, such as a plug-in hard disk equipped on the computer device, a smart memory card (SMC), a secure digital (SD) card, a flash card (flash card), etc. Further, the computer-readable storage medium may also include both the internal storage unit and the external storage device of the computer device. The computer-readable storage medium is configured to store the computer program and other programs and data required by the computer device. The computer-readable storage medium may also be configured to temporarily store data that has been output or will be output.

An embodiment of the present application provides a computer program product or a computer program, including computer instructions stored in a computer-readable storage medium. A processor of a computer device reads the computer instructions from the computer-readable storage medium, and the processor executes the computer instructions, so that the computer device implements the bullet screen comment display method in the foregoing embodiments corresponding to FIG. 3, the bullet screen comment sending method in the foregoing embodiments corresponding to FIG. 7, and the bullet screen comment display method in the foregoing embodiments corresponding to FIG. 8. Therefore, details are not repeated herein. In addition, the description of beneficial effects of the same method are not described herein again. For technical details that are not disclosed in the computer-readable storage medium embodiments of the present application, refer to the descriptions of the method embodiments of the present application.

In the specification and claims of the embodiments of the present application, the terms such as "first" and "second" are used to distinguish between different objects, but are not used to describe a particular order. In addition, the terms "include" and any variant thereof are intended to cover a non-exclusive inclusion. For example, a process, a method, an apparatus, a product, or a device that includes a series of steps or units is not limited to the listed steps or modules; and instead, further includes steps or modules that are not listed, or further includes another step or unit that is intrinsic to the process, method, apparatus, product, or device.

A person of ordinary skill in the art may understand that, units and algorithm steps of the examples described in the foregoing disclosed embodiments may be implemented by electronic hardware, computer software, or a combination thereof. To clearly describe the interchangeability between the hardware and the software, the foregoing has generally described compositions and steps of each example based on functions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of embodiments of the present application.

The methods and related apparatuses provided by the embodiments of the present application are described with reference to the method flowchart and/or the schematic structural diagram provided by the embodiments of the present application. Specifically, each flow and/or block in the method flowchart and/or schematic structural diagram and the combination of flow and/or block in the flowchart and/or block diagram may be realized by computer program instructions. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the schematic structural diagrams. These computer program instructions may also be stored in a computer-readable memory that may instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the schematic structural diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. What is disclosed above is merely an example of the embodiments of the present application, and certainly is not intended to limit the protection scope of the present application. Therefore, equivalent variations made in accordance with the claims of the present application shall fall within the scope of the embodiments of the present application.

What is claimed is:

1. A bullet screen comment display method performed by a computer device, the method comprising:
   displaying an interactive interface of a target scenario;
   displaying, on the interactive interface, dynamic movements of a first bullet screen comment set moving in a first moving direction and a second bullet screen comment set moving in a second moving direction, wherein the first bullet screen comment set comprises N pieces of first bullet screen comment data; the second bullet screen comment set comprises M pieces of second bullet screen comment data; N and M are positive integers; and the first moving direction and the second moving direction are different moving directions and a current location of a respective bullet screen comment on the interactive interface is determined by a generation timestamp of the bullet screen comment, an initial position of the bullet screen comment and a moving direction of the bullet screen comment;
   dynamically determining that at least a first bullet screen comment in the first bullet screen comment set is on a trajectory of colliding with at least a second bullet screen comment in the second bullet screen comment set;
   determining, for a plurality of collisions, corresponding colliding locations and colliding moments between the first bullet screen comment set and the second bullet screen comment set based on the respective generation timestamps, initial positions, and moving directions of the N pieces of first bullet screen comment data and the M pieces of second bullet screen comment data; and
   displaying a colliding effect for each collision of the plurality of collisions at a respective one of the corresponding colliding positions and colliding moments including at least dynamically removing the first bullet screen comment and the second bullet screen comment from the interactive interface.

2. The method according to claim 1, wherein the method further comprises:
   when there is a confrontation trigger event between the first bullet screen comment data in the first bullet screen comment set and the second bullet screen comment data in the second bullet screen comment set, triggering a confrontation display event between the first bullet screen comment data and the second bullet screen comment data related to the confrontation trigger event.

3. The method according to claim 2, wherein the triggering a confrontation display event between the first bullet screen comment data and the second bullet screen comment data related to the confrontation trigger event comprises:
   displaying a confrontation animation between the first bullet screen comment and the second bullet screen comment on the interactive interface, and performing any one of the following processing:
   hiding the first bullet screen comment and the second bullet screen comment on the interactive interface during the display process of the confrontation animation;
   hiding the first bullet screen comment and the second bullet screen comment on the interactive interface after the confrontation animation display is completed; and
   hiding the first bullet screen comment and the second bullet screen comment on the interactive interface before the confrontation animation display.

4. The method according to claim 2, wherein the confrontation trigger event comprises that the first bullet screen comment and the second bullet screen comment are at a same display position of the interactive interface at a same moment; and
   the triggering a confrontation display event between the first bullet screen comment data and the second bullet screen comment data related to the confrontation trigger event comprises:
   hiding the first bullet screen comment and the second bullet screen comment on the interactive interface.

5. The method according to claim 2, wherein the confrontation trigger event comprises that the first bullet screen comment and the second bullet screen comment are at a same display position of the interactive interface at a same moment; and
   the triggering a confrontation display event between the first bullet screen comment data and the second bullet screen comment data related to the confrontation trigger event comprises:
   displaying a confrontation animation between the first bullet screen comment and the second bullet screen comment on the interactive interface.

6. The method according to claim 1, wherein the target scenario is a match live broadcast scenario; the interactive interface is a match live broadcast interface in the match live broadcast scenario; the match live broadcast scenario comprises a first match team and a second match team; the first bullet screen comment set is a bullet screen comment set for the first match team; and the second bullet screen comment set is a bullet screen comment set for the second match team.

7. The method according to claim 6, wherein before the displaying, on the interactive interface, dynamic movements of a first bullet screen comment set moving in a first moving direction, and displaying, on the interactive interface, a second bullet screen comment set moving in a second moving direction, the method further comprises:
   displaying a match team selection list comprising the first match team and the second match team;
   obtaining a selected match team in response to a selection operation on a target match team in the match team selection list;
   using entered bullet screen comment data as the first bullet screen comment data in the first bullet screen comment set when the target match team is the first match team; and
   using entered bullet screen comment data as the second bullet screen comment data in the second bullet screen comment set when the target match team is the second match team.

8. The method according to claim 1, wherein the target scenario is a topic interaction scenario; the topic interaction scenario comprises a first topic viewpoint and a second topic viewpoint; the first bullet screen comment set is a bullet screen comment set aimed at the first topic viewpoint; and the second bullet screen comment set is a bullet screen comment set aimed at the second topic viewpoint.

9. A computer device, comprising:
   a memory, configured to store an executable instruction; and
   a processor, configured to execute the executable program stored in the memory, to perform a bullet screen comment display method, the method including:
   displaying an interactive interface of a target scenario;
   displaying, on the interactive interface, dynamic movements of a first bullet screen comment set moving in a first moving direction and a second bullet screen comment set moving in a second moving direction, wherein the first bullet screen comment set comprises N pieces of first bullet screen comment data; the second bullet screen comment set comprises M pieces of second bullet screen comment data; N and M are positive integers; and the first moving direction and the second moving direction are different moving directions and a current location of a respective bullet screen comment on the interactive interface is determined by a generation timestamp of the bullet screen comment, an initial position of the bullet screen comment and a moving direction of the bullet screen comment;

dynamically determining that at least a first bullet screen comment in the first bullet screen comment set is on a trajectory of colliding with at least a second bullet screen comment in the second bullet screen comment set;

determining, for a plurality of collisions, corresponding colliding locations and colliding moments between the first bullet screen comment set and the second bullet screen comment set based on the respective generation timestamps, initial positions, and moving directions of the N pieces of first bullet screen comment data and the M pieces of second bullet screen comment data; and displaying a colliding effect for each collision of the plurality of collisions at a respective one of the corresponding colliding positions and colliding moments including at least dynamically removing the first bullet screen comment and the second bullet screen comment from the interactive interface.

10. The computer device according to claim 9, wherein the method further comprises:

when there is a confrontation trigger event between the first bullet screen comment data in the first bullet screen comment set and the second bullet screen comment data in the second bullet screen comment set, triggering a confrontation display event between the first bullet screen comment data and the second bullet screen comment data related to the confrontation trigger event.

11. The computer device according to claim 10, wherein the triggering a confrontation display event between the first bullet screen comment data and the second bullet screen comment data related to the confrontation trigger event comprises:

displaying a confrontation animation between the first bullet screen comment and the second bullet screen comment on the interactive interface, and performing any one of the following processing:

hiding the first bullet screen comment and the second bullet screen comment on the interactive interface during the display process of the confrontation animation;

hiding the first bullet screen comment and the second bullet screen comment on the interactive interface after the confrontation animation display is completed; and hiding the first bullet screen comment and the second bullet screen comment on the interactive interface before the confrontation animation display.

12. The computer device according to claim 10, wherein the confrontation trigger event comprises that the first bullet screen comment and the second bullet screen comment are at a same display position of the interactive interface at a same moment; and the triggering a confrontation display event between the first bullet screen comment data and the second bullet screen comment data related to the confrontation trigger event comprises:

hiding the first bullet screen comment and the second bullet screen comment on the interactive interface.

13. The computer device according to claim 10, wherein the confrontation trigger event comprises that the first bullet screen comment and the second bullet screen comment are at a same display position of the interactive interface at a same moment; and the triggering a confrontation display event between the first bullet screen comment data and the second bullet screen comment data related to the confrontation trigger event comprises:

displaying a confrontation animation between the first bullet screen comment and the second bullet screen comment on the interactive interface.

14. The computer device according to claim 10, wherein the target scenario is a match live broadcast scenario; the interactive interface is a match live broadcast interface in the match live broadcast scenario; the match live broadcast scenario comprises a first match team and a second match team; the first bullet screen comment set is a bullet screen comment set for the first match team; and the second bullet screen comment set is a bullet screen comment set for the second match team.

15. The computer device according to claim 14, wherein before the displaying, on the interactive interface, dynamic movements of a first bullet screen comment set moving in a first moving direction, and displaying, on the interactive interface, a second bullet screen comment set moving in a second moving direction, the method further comprises:

displaying a match team selection list comprising the first match team and the second match team;

obtaining a selected match team in response to a selection operation on a target match team in the match team selection list;

using entered bullet screen comment data as the first bullet screen comment data in the first bullet screen comment set when the target match team is the first match team; and using entered bullet screen comment data as the second bullet screen comment data in the second bullet screen comment set when the target match team is the second match team.

16. The computer device according to claim 9, wherein the target scenario is a topic interaction scenario; the topic interaction scenario comprises a first topic viewpoint and a second topic viewpoint; the first bullet screen comment set is a bullet screen comment set aimed at the first topic viewpoint; and the second bullet screen comment set is a bullet screen comment set aimed at the second topic viewpoint.

17. A non-transitory computer-readable storage medium, storing an executable instruction that, when executed by a processor of a computer device, cause the computer device to perform a bullet screen comment display method, the method including:

displaying an interactive interface of a target scenario;

displaying, on the interactive interface, dynamic movements of a first bullet screen comment set moving in a first moving direction and a second bullet screen comment set moving in a second moving direction, wherein the first bullet screen comment set comprises N pieces of first bullet screen comment data; the second bullet screen comment set comprises M pieces of second bullet screen comment data; N and M are positive integers; and the first moving direction and the second moving direction are different moving directions and a current location of a respective bullet screen comment on the interactive interface is determined by a generation timestamp of the bullet screen comment, an initial position of the bullet screen comment and a moving direction of the bullet screen comment;

dynamically determining that at least a first bullet screen comment in the first bullet screen comment set is on a trajectory of colliding with at least a second bullet screen comment in the second bullet screen comment set;

determining, for a plurality of collisions, corresponding colliding locations and colliding moments between the first bullet screen comment set and the second bullet screen comment set based on the respective generation timestamps, initial positions, and moving directions of the N pieces of first bullet screen comment data and the M pieces of second bullet screen comment data; and displaying a colliding effect for each collision of the plurality of collisions at a respective one of the corresponding colliding positions and colliding moments including at least dynamically removing the first bullet screen comment and the second bullet screen comment from the interactive interface.

18. The non-transitory computer-readable storage medium according to claim 17, wherein the method further comprises:

when there is a confrontation trigger event between the first bullet screen comment data in the first bullet screen comment set and the second bullet screen comment data in the second bullet screen comment set, triggering a confrontation display event between the first bullet screen comment data and the second bullet screen comment data related to the confrontation trigger event.

19. The non-transitory computer-readable storage medium according to claim 18, wherein the triggering a confrontation display event between the first bullet screen comment data and the second bullet screen comment data related to the confrontation trigger event comprises:

displaying a confrontation animation between the first bullet screen comment and the second bullet screen comment on the interactive interface, and performing any one of the following processing:

hiding the first bullet screen comment and the second bullet screen comment on the interactive interface during the display process of the confrontation animation;

hiding the first bullet screen comment and the second bullet screen comment on the interactive interface after the confrontation animation display is completed; and hiding the first bullet screen comment and the second bullet screen comment on the interactive interface before the confrontation animation display.

20. The non-transitory computer-readable storage medium according to claim 18, wherein the confrontation trigger event comprises that the first bullet screen comment and the second bullet screen comment are at a same display position of the interactive interface at a same moment; and the triggering a confrontation display event between the first bullet screen comment data and the second bullet screen comment data related to the confrontation trigger event comprises:

hiding the first bullet screen comment and the second bullet screen comment on the interactive interface.

21. The non-transitory computer-readable storage medium according to claim 18, wherein the confrontation trigger event comprises that the first bullet screen comment and the second bullet screen comment are at a same display position of the interactive interface at a same moment; and the triggering a confrontation display event between the first bullet screen comment data and the second bullet screen comment data related to the confrontation trigger event comprises:

displaying a confrontation animation between the first bullet screen comment and the second bullet screen comment on the interactive interface.

* * * * *